(12) United States Patent
Ford

(10) Patent No.: US 12,196,243 B2
(45) Date of Patent: Jan. 14, 2025

(54) TORQUE-LIMITING AXLE NUT

(71) Applicant: Amsted Rail Company, Inc., Chicago, IL (US)

(72) Inventor: Brian Ford, Moseley, VA (US)

(*) Notice: Subject to any disclaimer, the term of this patent is extended or adjusted under 35 U.S.C. 154(b) by 175 days.

(21) Appl. No.: 18/099,803

(22) Filed: Jan. 20, 2023

(65) Prior Publication Data
US 2024/0247674 A1 Jul. 25, 2024

(51) Int. Cl.
*F16B 31/02* (2006.01)

(52) U.S. Cl.
CPC .................................... *F16B 31/02* (2013.01)

(58) Field of Classification Search
CPC .......... F16B 23/00; F16B 31/04; F16B 33/00; F16B 37/00; F16B 39/10; F16B 39/24; F16B 43/00; Y10S 411/917
USPC ......................................... 411/1, 6, 427, 432
See application file for complete search history.

(56) References Cited

U.S. PATENT DOCUMENTS

| | | | |
|---|---|---|---|
| 5,180,265 A | 1/1993 | Wiese | |
| 6,082,941 A | 7/2000 | Dupont et al. | |
| 6,135,642 A * | 10/2000 | Burch .................. | F16C 35/067 384/540 |
| 7,811,038 B2 | 10/2010 | Jimenez | |
| 8,292,373 B2 | 10/2012 | Rieger et al. | |
| 8,534,770 B2 | 9/2013 | White et al. | |
| 9,746,019 B2 | 8/2017 | Oh et al. | |
| 10,323,676 B2 | 6/2019 | Hughes et al. | |
| 2011/0014004 A1 * | 1/2011 | Yasui ...................... | F16B 39/02 411/1 |
| 2011/0027041 A1 | 2/2011 | Friesen et al. | |
| 2013/0239395 A1 | 9/2013 | Schuster et al. | |
| 2018/0021845 A1 | 1/2018 | LeMieux | |
| 2018/0083384 A1 | 3/2018 | Burns et al. | |

(Continued)

FOREIGN PATENT DOCUMENTS

| | | |
|---|---|---|
| GB | 105640 A | 4/1917 |
| GB | 532767 A | 1/1941 |
| WO | WO 96/21957 A1 | 7/1993 |

(Continued)

OTHER PUBLICATIONS

PCT/US2024/012030 International Search Report and Written Opinion dated Apr. 30, 2024, 7 pages.

(Continued)

*Primary Examiner* — Roberta S Delisle
(74) *Attorney, Agent, or Firm* — COZEN O'CONNOR

(57) ABSTRACT

A torque-limiting axle nut includes an inner nut having an inner-nut body forming a threaded center hole that defines a rotation axis. The inner nut also has a flange that encircles and extends radially away from the inner-nut body. The flange forms a plurality of recesses. The axle nut also includes a retaining ring encircling the inner-nut body and an outer nut encircling the inner-nut body. The outer nut forms grooves that extend axially upward from a bottom face of the outer nut and that extend azimuthally around the rotation axis. For each pair of neighboring grooves, the outer nut forms a ridge therebetween. The axle nut also includes a wave spring that encircles the inner-nut body and is located axially between the retaining ring and the outer nut. The axle nut also includes ball bearings seated in the recesses and extending into the grooves.

26 Claims, 17 Drawing Sheets

(56) References Cited

U.S. PATENT DOCUMENTS

2020/0076140 A1\* 3/2020 Ketzer ................... F16B 31/02
2021/0108666 A1 4/2021 Seeds et al.

FOREIGN PATENT DOCUMENTS

WO     WO 2002008617 A1     1/2002
WO     WO 2010/036110 A1     4/2010

OTHER PUBLICATIONS

PCT/US2022/040585 International Search Report and Written Opinion dated Nov. 15, 2022, 10 pages.
U.S. Appl. No. 17/406,000, Office Action dated May 25, 2023, 15 pages.

\* cited by examiner

TORQUE-LIMITING AXLE NUT

BACKGROUND

A nut is a piece of hardware that may be threaded onto an axle or spindle to secure a wheel. When installing, the correct torque should be applied to the nut to maximize bearing life and to ensure that the axle nut will not loosen over time.

SUMMARY

The present embodiments include a torque-limiting axle nut that uses a torque-limiting mechanism to advantageously allow the axle nut to be tightened to a threshold torque using a common wrench (also referred to as a "spanner" in some parts of the world). When torque in excess of this threshold torque is applied, the torque-limiting axle nut "spins out", similar to a torque limiter in an electric drill. The threshold torque is determined by the geometry of the axle nut and is therefore set by design.

By integrating the torque-limiting mechanism into the axle nut, a torque wrench is not needed. Since torque wrenches are generally more expensive than other more-common types of wrenches, and therefore not as readily available, the torque-limiting axle nut makes it easier for mechanics and truck drivers to work on wheel assemblies. In addition, installation cost can be lowered in a factory setting since the torque-limiting axle nut does not require an industrial-scale pneumatic or electric torque wrench. Such equipment is expensive and requires continuous maintenance and quality checks.

The torque-limiting axle nut prevents certain types of user error that can arise when tightening and loosening conventional axle nuts. One such user error is selection of the wrong torque wrench, which can result in the conventional axle nut being over-tightened or under-tightened. Another user error is selecting a common wrench (e.g., an open-ended wrench or crescent wrench) for an application that requires a torque wrench. Furthermore, torque wrenches should be calibrated periodically since their torque values change over time. Accordingly, even when the proper torque wrench is selected, it may not operate at its specified torque.

In some embodiments, the torque-limiting axle nut includes a locator plate for creating an axial force that urges the internal threads of the axle nut against the external threads of an axle, spindle, or threaded rod. This axial force resists rotation of the torque-limiting axle nut, especially in the presence of vibration and motion that can loosen an axle nut. The locator plate compresses a spring plunger to establish a minimum loosening torque that must be overcome to loosen the torque-limiting axle nut once it has been tightened to the threshold torque. Advantageously, the axial force created by this compressed spring plunger is not established by friction between components. Such friction forces tend to degrade over time as the components wear away via abrasion due to vibrations and motion. Since the minimum loosening torque does not rely on friction, it will not degrade over time as rapidly. This advantage is particularly important for truck axles since a loose axle nut can catastrophically result in premature wear of the wheel bearing or even the entire wheel assembly falling off.

The torque-limiting axle nut may be used in any application that uses a nut or similar types of threaded fastener. Of particular importance are wheel assemblies. The torque-limiting mechanism pre-loads wheel bearings to their specified values, thereby ensuring that the bearings are not over-compressed, which can result in excessive wear that shortens their lifetime and could lead to premature failure. Furthermore, the torque-limiting axle nut may be unitized to prevent its components from separating. Unitization also prevents unauthorized users from tampering with the wheel assembly.

DETAILED DESCRIPTION

Figure 1:
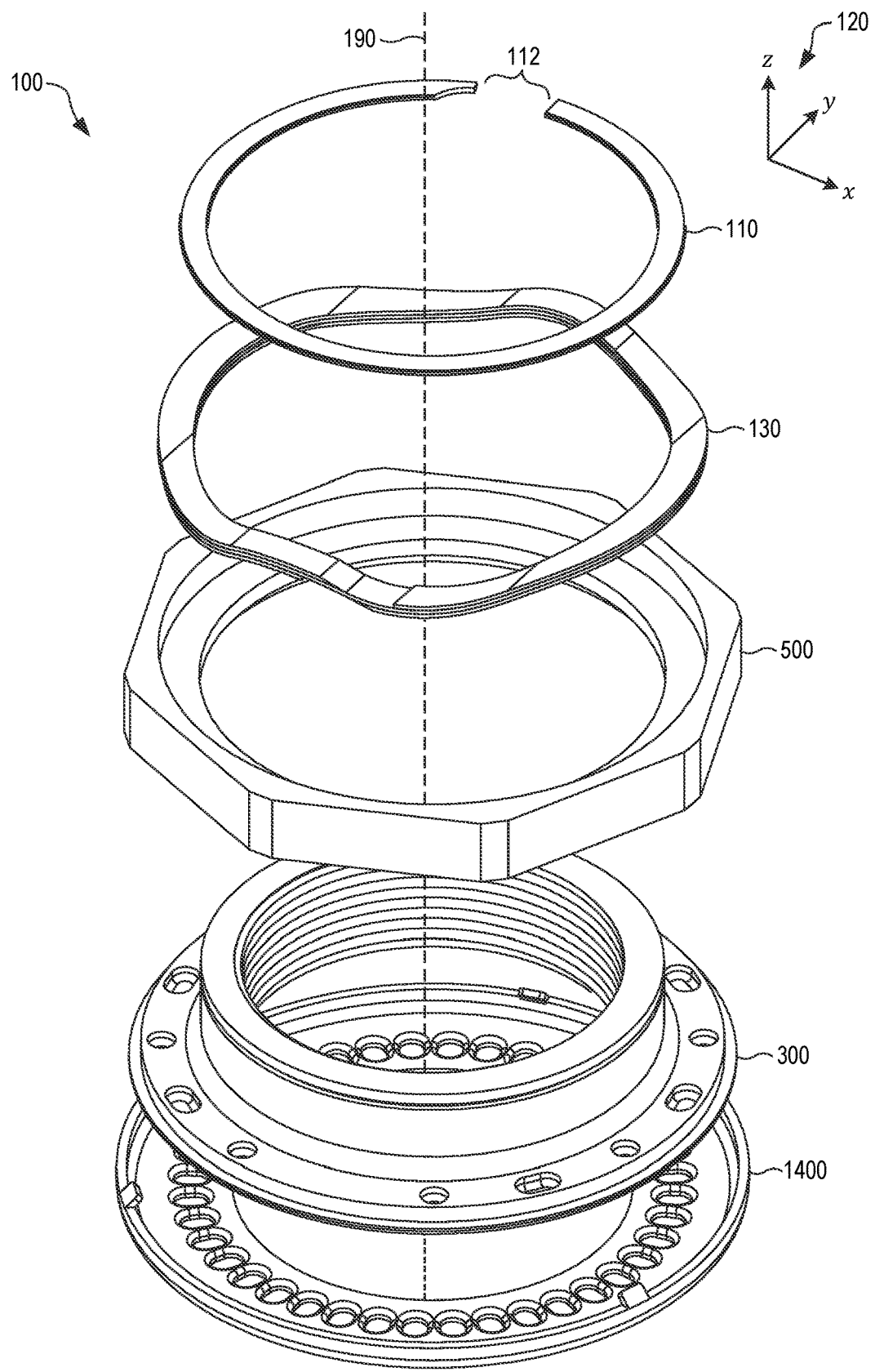
FIG. 1 is an exploded view of a torque-limiting axle nut, in embodiments.
Figure 2:
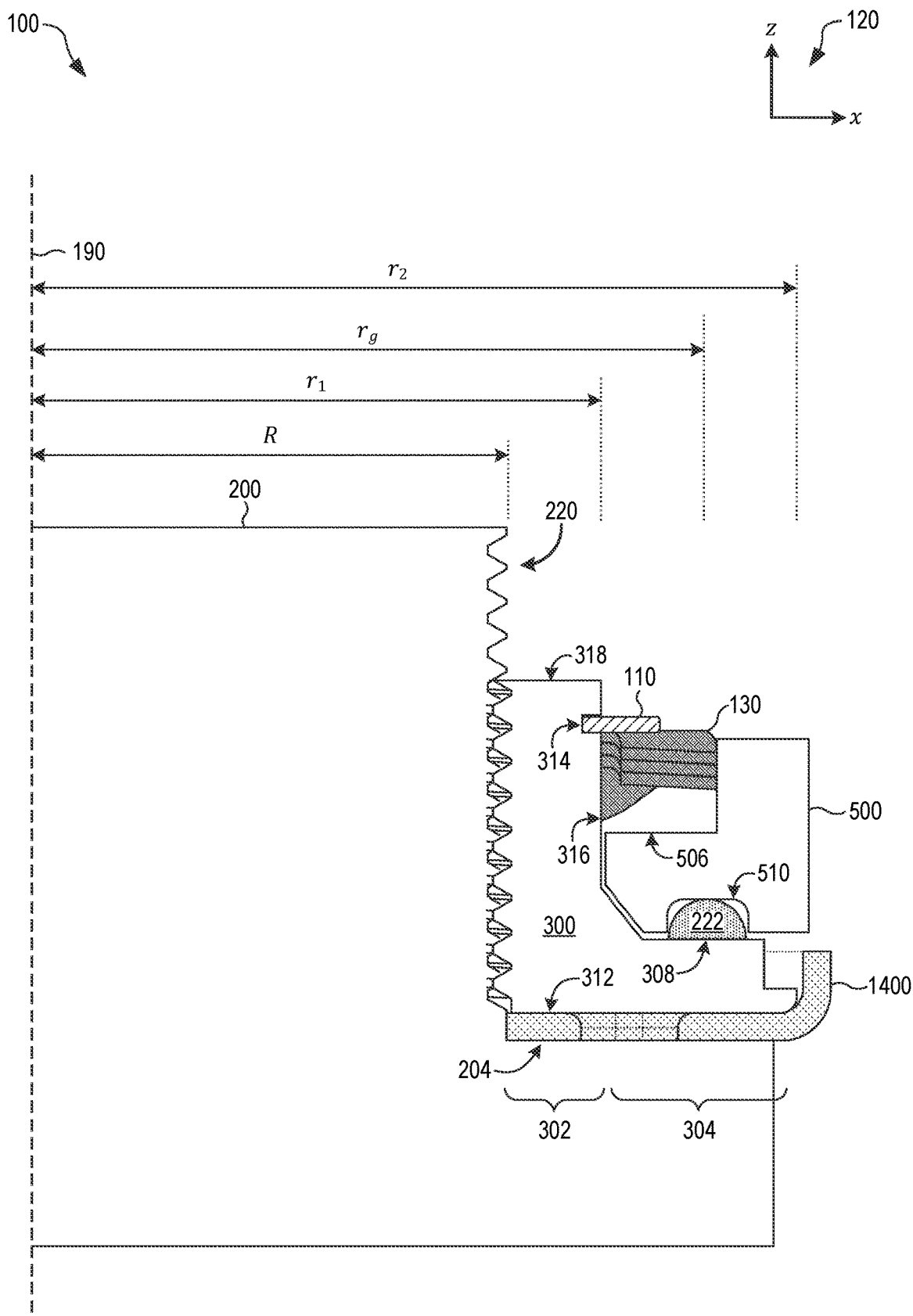
FIG. 2 is a side cross-sectional view of the torque-limiting axle nut of FIG. 1 when secured to a threaded axle.
Figure 4:
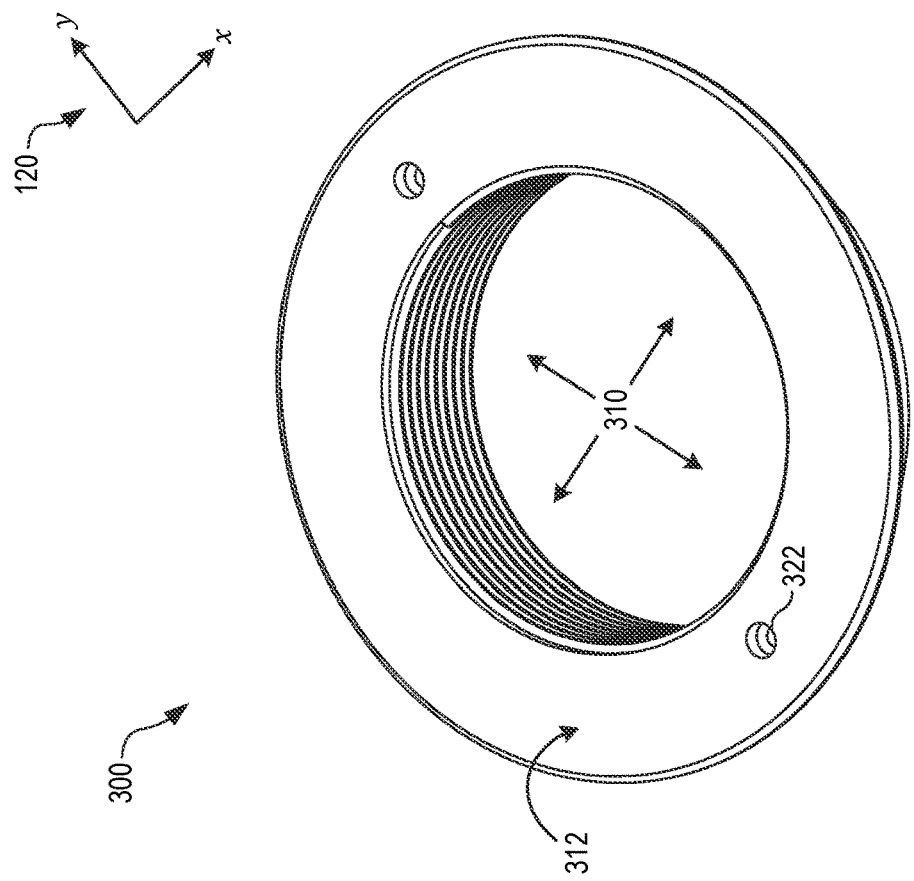
FIGS. 3 and 4 are perspective views of an inner nut of the torque-limiting axle nut of FIG. 1, from the top and bottom, respectively.
Figure 3:
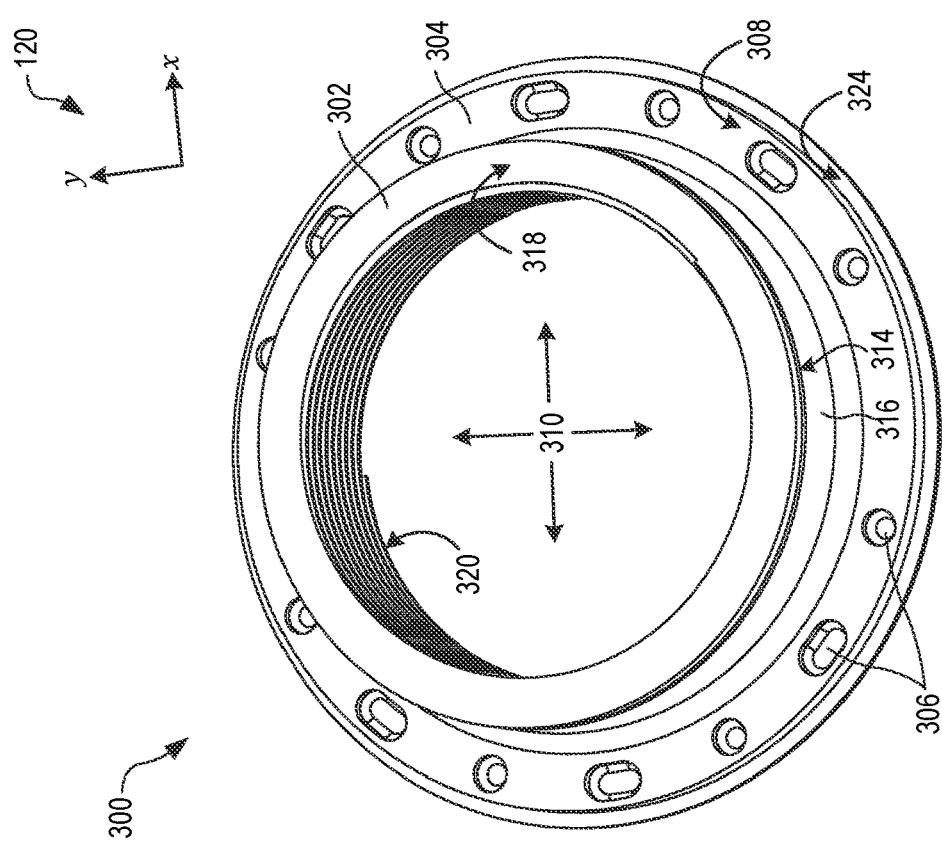
Figure 6:
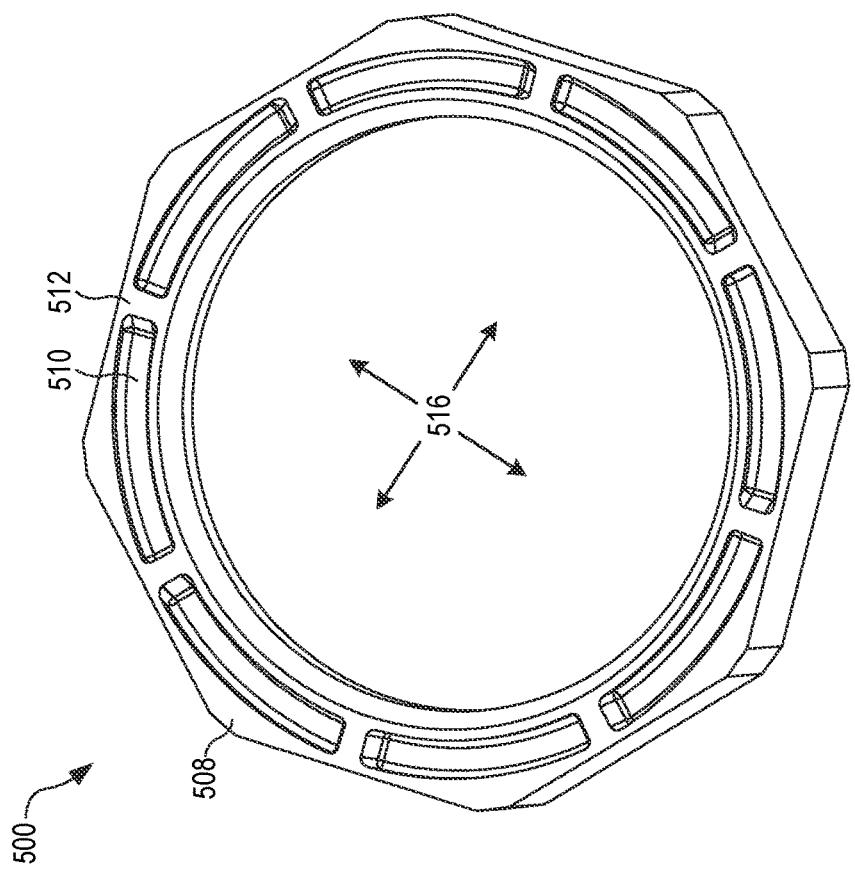
FIGS. 5 and 6 are perspective views of an outer nut of the torque-limiting axle nut of FIG. 1, from the top and bottom, respectively.
Figure 5:
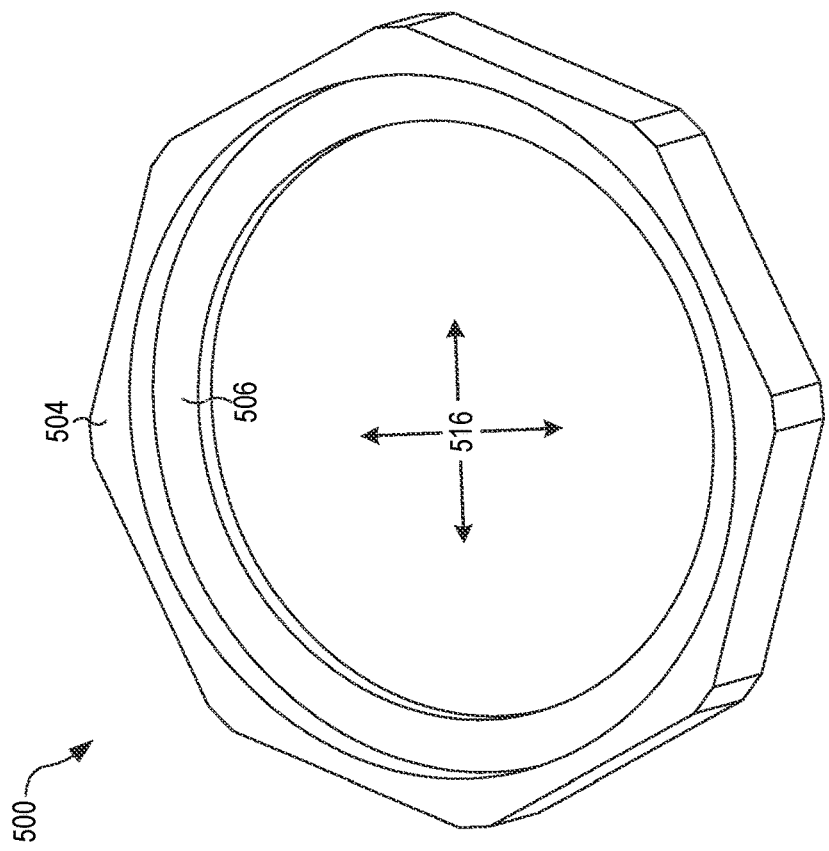

FIG. 1 is an exploded view of a torque-limiting axle nut 100 that includes a retaining ring 110, a wave spring 130, an inner nut 300, and an outer nut 500. FIG. 2 is a side cross-sectional view of the torque-limiting axle nut 100 of FIG. 1 when secured to a threaded axle 200. FIGS. 3 and 4 are perspective views of the inner nut 300 from the top and bottom, respectively. FIGS. 5 and 6 are perspective views of the outer nut 500 from the top and bottom, respectively. FIGS. 1-6 are best viewed together with the following description.

The inner nut 300 is ring-shaped, forming a threaded center hole 310 with internal threads 320 that match external threads 220 of the axle 200. The center hole 310 and axle 200 are coaxial to a rotation axis 190 about which the inner nut 300 rotates and along which the inner nut 300 linearly translates to engage with the external threads 220. As shown in FIGS. 1, 3, and 4, the inner nut 300 may azimuthally extend entirely around the rotation axis 190, in which case the inner nut 300 fully encircles the rotation axis 190.

For clarity herein, it is assumed that the rotation axis 190 is parallel to the z axis of a right-handed Cartesian coordinate system 120, where the inner nut 300 translates in the −z direction when engaging with the axle 200 (i.e., tightening) and in the +z direction when disengaging from the axle 200 (i.e., loosening). Also for clarity, several features of the present embodiments are described in terms of a cylindrical coordinate system that is equivalent to the Cartesian coordinate system 120. Thus, the terms "axial" and "axially" refer to directions parallel to the z axis, the terms "radial" and "radially" refer to scalar distances from the rotation axis 190 in any plane that is parallel to the x-y plane, and the terms "azimuthal" and "azimuthally" refer to angular coordinates around the rotation axis 190.

The inner nut 300 has an inner-nut body 302 with an outer radius $r_1$ that is greater than a radius R of the axle 200. The inner nut 300 also has a flange 304 that is located azimuthally around the inner-nut body 302 and extends radially away from the inner-nut body 302. Thus, the flange 304 has an outer radius $r_2$ that is greater than the outer radius $r_1$. The flange 304 has a top face 308 that faces axially upward (i.e., in the +z direction) and a bottom face 312 that faces axially downward (i.e., in the −z direction). As shown in FIG. 4, the bottom of the inner-nut body 302 may lie flush with the bottom face 312, in which case the inner-nut body 302 and the flange 304 share the bottom face 312. However, the bottom of the inner-nut body 302 need not lie flush with the bottom face 312.

As shown in FIG. 3, the flange 304 forms a plurality of recesses 306 at various azimuthal locations. The recesses 306 are centered identically at the same radial distance from the rotation axis 190. Each recess 306 extends axially downward from the top face 308. For clarity, only two recesses 306 are labeled in FIG. 3. Each recess 306 is sized to accept a ball bearing 222, and therefore may be shaped as a circle, a stadium, or another shape within which the ball bearing 222 can sit. As shown in FIG. 2, only a portion of the ball bearing 222 sits within the recess 306 such that some of the ball bearing 222 lies above the top face 308 (also see FIG. 7). In embodiments, the ball bearings 222 all have the same diameter. Translationally, each ball bearing 222 is fixed in its corresponding recess 306. However, each ball bearing 222 may rotate within its corresponding recess 306 when the outer nut 500 is rotated relative to the inner nut 300 (e.g., when the torque-limiting axle nut 100 is threaded onto the axle 200).

FIG. 3 shows the inner nut 300 with fourteen recesses 306. In this case, the torque-limiting axle nut 100 can accommodate up to fourteen ball bearings 222. However, the inner nut 300 may have a different number of recesses 306 and ball bearings 222 without departing from the scope hereof. As shown in FIG. 3, the recesses 306 need not all be identically shaped. Furthermore, it is not necessary that the recesses 306 be uniformly spaced around the rotation axis 190 (i.e., azimuthally). While FIGS. 3 and 4 show the recesses 306 are blind holes that do not pass, along z, entirely through the flange 304, one or more of the recesses 306 may alternatively be a through-hole that extends entirely through the flange 304.

The inner nut 300 forms a notch 314 that extends azimuthally around the inner nut 300 and radially inward from an outward-facing surface 316 of the inner-nut body 302. The notch 314 is sized to accept a radially-inward portion of the retaining ring 110. To facilitate insertion of the retaining ring 110 into the notch 314, the retaining ring 110 may be split (see the gap 112 in FIG. 1). In this case, the retaining ring 110 subtends an azimuthal range less than 360°. Alternatively, the retaining ring 110 may subtend an azimuthal range equal to 360°, in which case the retaining ring 110 fully encircles the inner nut 300. The retaining ring 110 has an inner diameter less than the outer radius $r_1$. Thus, when the retaining ring 110 is inserted into the notch 314 (see FIG. 2), the inner nut 300 axially constrains the retaining ring 110. Examples of the retaining ring 110 include, but are not limited to, spiral retaining rings, a constant-section retaining rings, circlips, and snap rings. The retaining ring 110 may be axially assembled or radially assembled.

The outer nut 500 is ring shaped, forming an unthreaded center hole 516 whose radius is slightly larger than the outer radius $r_1$ of the inner nut 300. This allows the outer nut 500 to encircle the inner-nut body 302. Since the center hole 516 is unthreaded, the outer nut 500 can rotate relative to the inner nut 300 when the torque-limiting axle nut 100 is not fully torqued around the axle 200. The outer nut 500 forms a ledge 506 that extends azimuthally around the unthreaded center hole 516, as shown in FIG. 5. The outer nut 500 also has a radial wall 504 that extends azimuthally around the ledge 506. As shown in FIGS. 1, 5, and 6, the ledge 506 and radial wall 504 may fully encircle the rotation axis 190. However, the ledge 506 may form one or more azimuthal gaps. Similarly, the radial wall 504 may form one or more azimuthal gaps.

Transverse to the rotation axis 190, the external shape of the radial wall 504 may be a regular octagon, as shown in FIGS. 5 and 6. Alternatively, the external shape may be a regular hexagon or another type of regular or irregular polygon. Due to its external shape, the radial wall 504 does not exhibit fully continuous rotational symmetry (i.e., circular symmetry) about the rotation axis 190. Instead, the radial wall 504 may exhibit discrete rotational symmetry about the rotation axis 190 when the external shape is a regular polygon. For example, the regular octagon shown in FIGS. 5 and 6 has eight-fold rotational symmetry about the rotation axis 190.

The outer nut 500 forms a plurality of grooves 510 that extend axially upward from a bottom face 508, as shown in FIG. 6. For clarity, only one of the grooves 510 is labeled in FIG. 6. Two azimuthally neighboring grooves 510 are separated by a ridge 512. As shown in FIG. 6, the bottom of each ridge 512 is flush with the bottom face 508. Each ridge 512 subtends an azimuthal angle that is less than that subtended by each groove 510. For example, in FIG. 6, where there are eight grooves 510 and eight ridges 512, each ridge 512 may subtend an azimuthal angle of 5°, in which case each groove 510 subtends an azimuthal angle of 40°. Each ridge 512 may subtend a different azimuthal angle without departing from the scope hereof. Similarly, the outer nut 500 may form a different number of grooves 510 without departing from the scope hereof.

As shown in FIG. 2, each groove 510 acts like a track through which a ball bearing 222 is guided when the outer nut 500 is rotated relative to the inner nut 300. Radially, each recess 306 of the inner nut 300 is centered at a radius $r_g$. The groove 510 is also radially centered near $r_g$. Therefore, the top of the ball bearing 222 is located near the radial center of the groove 510. Furthermore, the groove has a radial width that is large enough such that the ball bearing 222 can partially fit inside the groove 510.

In FIG. 1, the wave spring 130 extends azimuthally around the rotation axis 190. The wave spring 130 may fully encircle the rotation axis 190, in which case the wave spring 130 is single-turn. Alternatively, the wave spring 130 may have an azimuthal gap similar to the gap 112, in which case the wave spring 130 is split. Alternatively, the wave spring 130 may be a disc spring, Belleville washer, or other type of axially compressible ring-shaped component known in the art. As shown in FIG. 2, the wave spring 130 is axially confined between the ledge 506 and the retaining ring 110. When the torque-limiting axle nut 100 is unitized, as shown in FIG. 2, the wave spring 130 is partially compressed such that each ball bearing 222 is seated in one of the recesses 306 and one of the grooves 510. This compression ensures that the inner nut 300 and outer nut 500 do not become axially separated enough for the ball bearing 222 to fall out.

As shown in FIG. 2, the outer nut 500 lies entirely between a top face 318 of the inner nut 300 and the bottom face 312. Alternatively, part of the outer nut 500 (e.g., the radial wall 504) can extend upward past the top face 318 or downward below the bottom face 312.

FIGS. 7-11 illustrate how one ball bearing 222 cooperates with one ridge 512 to limit torque. For clarity in these figures, the movement of the ball bearing 222 around the rotational axis 190 has been "unwound" to appear linear. Thus, the horizontal dimension in these figures is the azimuthal angle $\phi$. The views in these figures are taken at the radius $r_g$ (see FIG. 2). FIGS. 7-11 are best viewed together with the following description.

Figure 7:
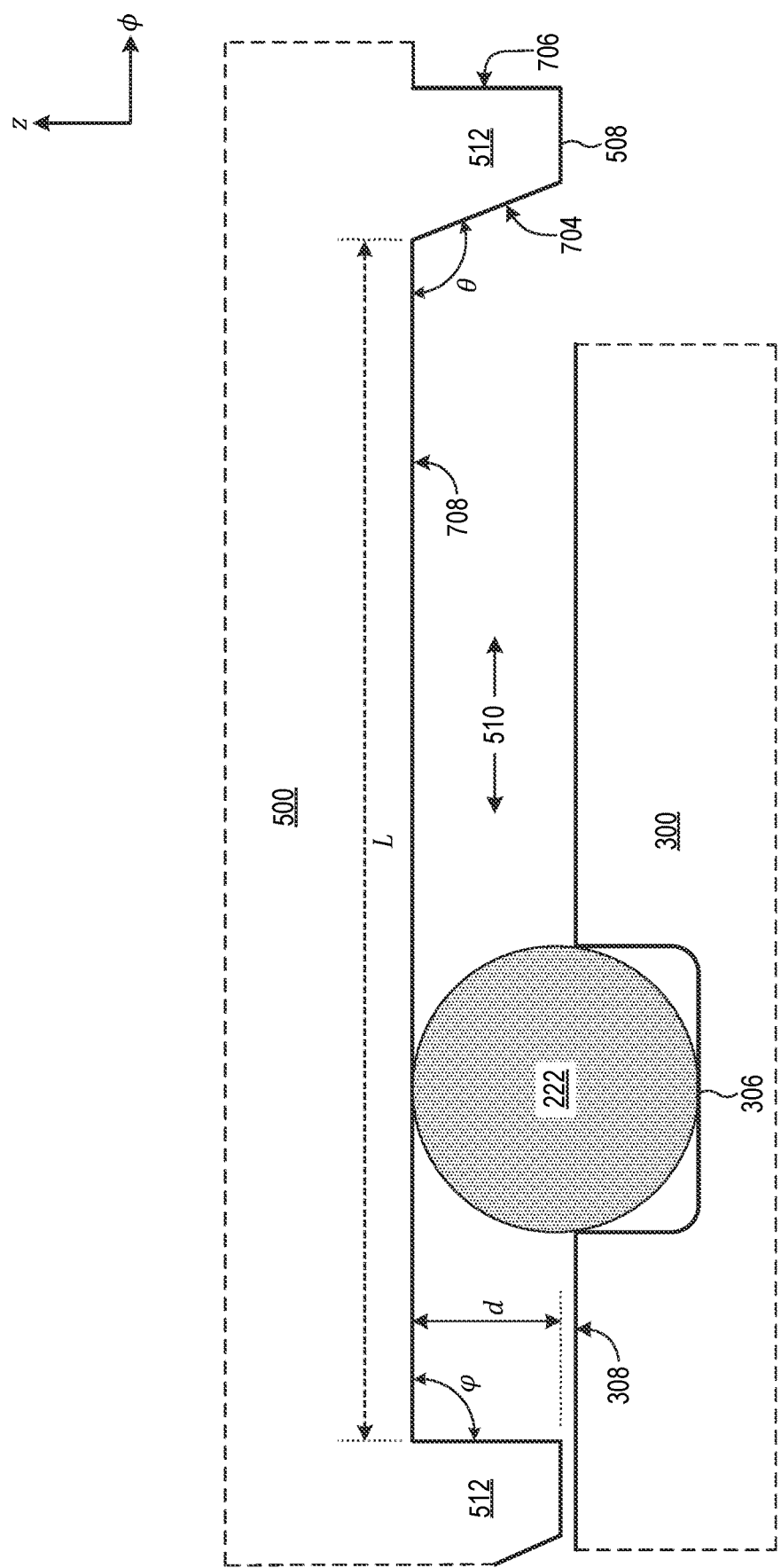
FIG. 7 shows how one ball bearing moves within one groove of the outer nut.
Figure 8:
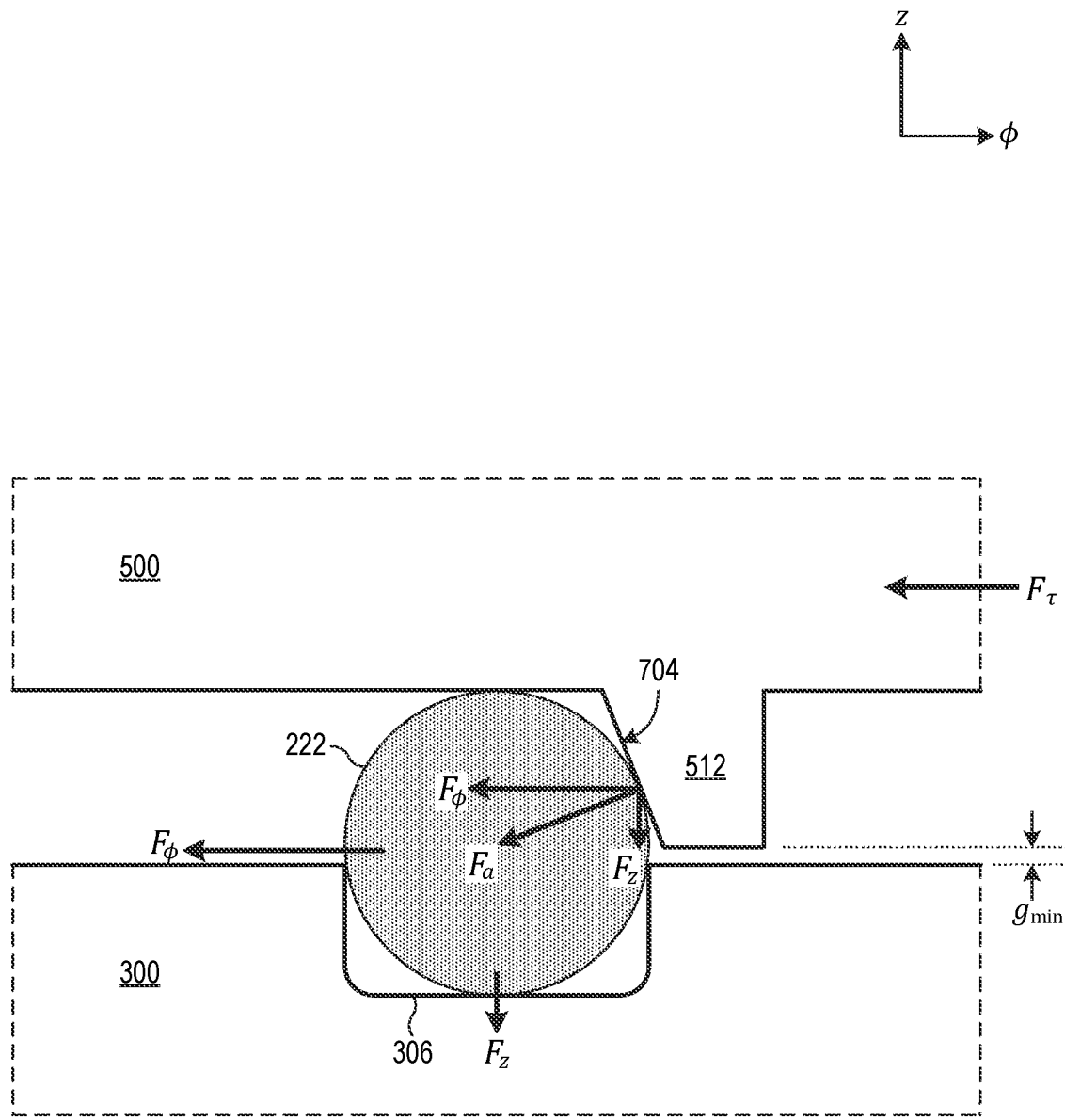
FIG. 8 shows how a torque applied to the outer nut rotates the outer nut relative to the inner nut.

FIG. 7 shows how one ball bearing 222 moves within one groove 510. The outer nut 500 forms a recessed surface 708 that is perpendicular to the rotational axis 190 (i.e., lies parallel to the x-y plane) and has an arc length L, as measured between a pair of azimuthally neighboring ridges 512. Each ridge 512 has a front face 704 forming an obtuse front angle $\theta$ relative to the recessed surface 708. The groove 510 has an axial depth d such that the top of the ball bearing 222 touches the recessed surface 708. As shown in FIG. 8, the bottom face 508 of the ridge 512 is separated from the top face 308 of the inner nut 300 by a minimum axial gap $g_{min}$.

FIG. 8 shows how a torque applied to the outer nut 500 rotates the outer nut 500 (i.e., right-to-left in the figure) relative to the inner nut 300. This torque advances the groove 510 relative to the ball bearing 222. In FIG. 8, the outer nut 500 has advanced, relative to the inner nut 300, such that the front face 704 of the ridge 512 contacts the ball bearing 222. The applied torque creates to a tangential force $F_\tau$. Due to the obtuse front angle $\theta$, the ridge 512 acts like a wedge that converts the tangential force $F_\tau$ into an angled force $F_\alpha$ having a tangential component $F_\phi$ and an axial component $F_z$. The ball bearing 222 transmits the axial component $F_z$ to the bottom of the recess 306 and the tangential component $F_\phi$ to the side of the recess 306. The tangential component $F_\phi$ is part of a transferred torque that causes the inner nut 300 to rotate around the rotational axis 190. In this case, the outer nut 500 and inner nut 300 will rotate together, or co-rotate, until the inner nut 300 bottoms out (i.e., the torque-limiting axle nut 100 is fully threaded onto the axle 200).

Figure 9:
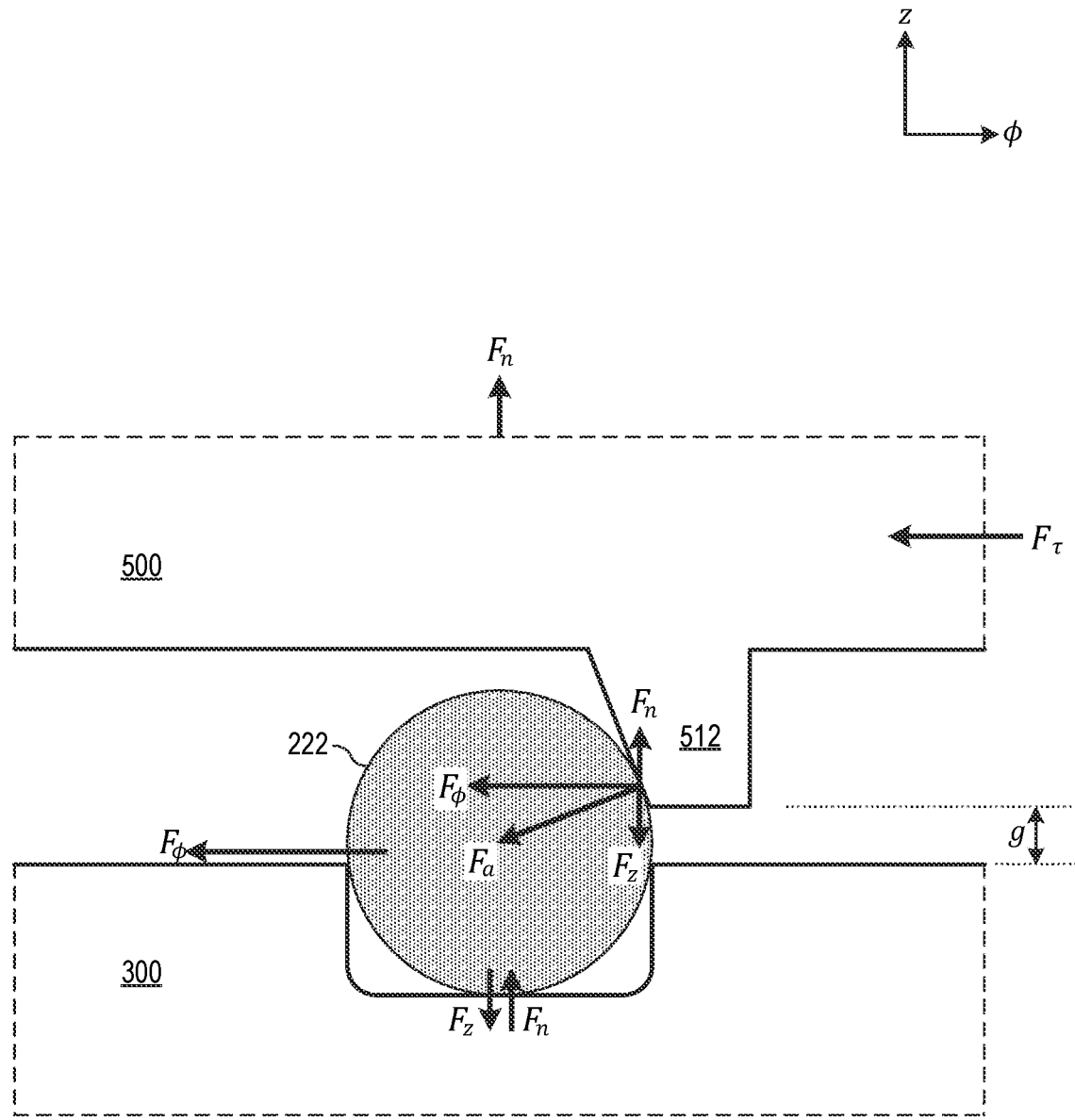
FIG. 9 shows a ridge riding up the ball bearing when an excessive torque is applied to the outer nut.

FIG. 9 shows the ridge 512 riding up the ball bearing 222 when an excessive torque is applied to the outer nut 500. In this case, the axial component $F_z$ is exerted downward on the inner nut 300, causing the internal threads 320 to push downward against the external threads 220 of the axle 200 (see FIG. 2). When the inner nut 300 cannot move downward in response to the axial component $F_z$, it will instead produce an upward normal force $F_n$ that the ball bearing 222 transmits back to the ridge 512. This normal force $F_n$ causes the outer nut 500 to move upward, thereby compressing the wave spring 130 (see FIGS. 12 and 13). As the tangential force $F_\tau$ increases, so does the axial component $F_z$ and normal force $F_n$. As the normal force $F_n$ increases, the outer nut 500 moves increasingly upward, thereby compressing the wave spring 130 more. As the outer nut 500 moves upward relative to the inner nut 300, the bottom face 508 of the ridge 512 is separated from the top face 308 of the inner nut 300 by an axial gap g that is greater than the minimum axial gap $g_{min}$.

Figure 10:
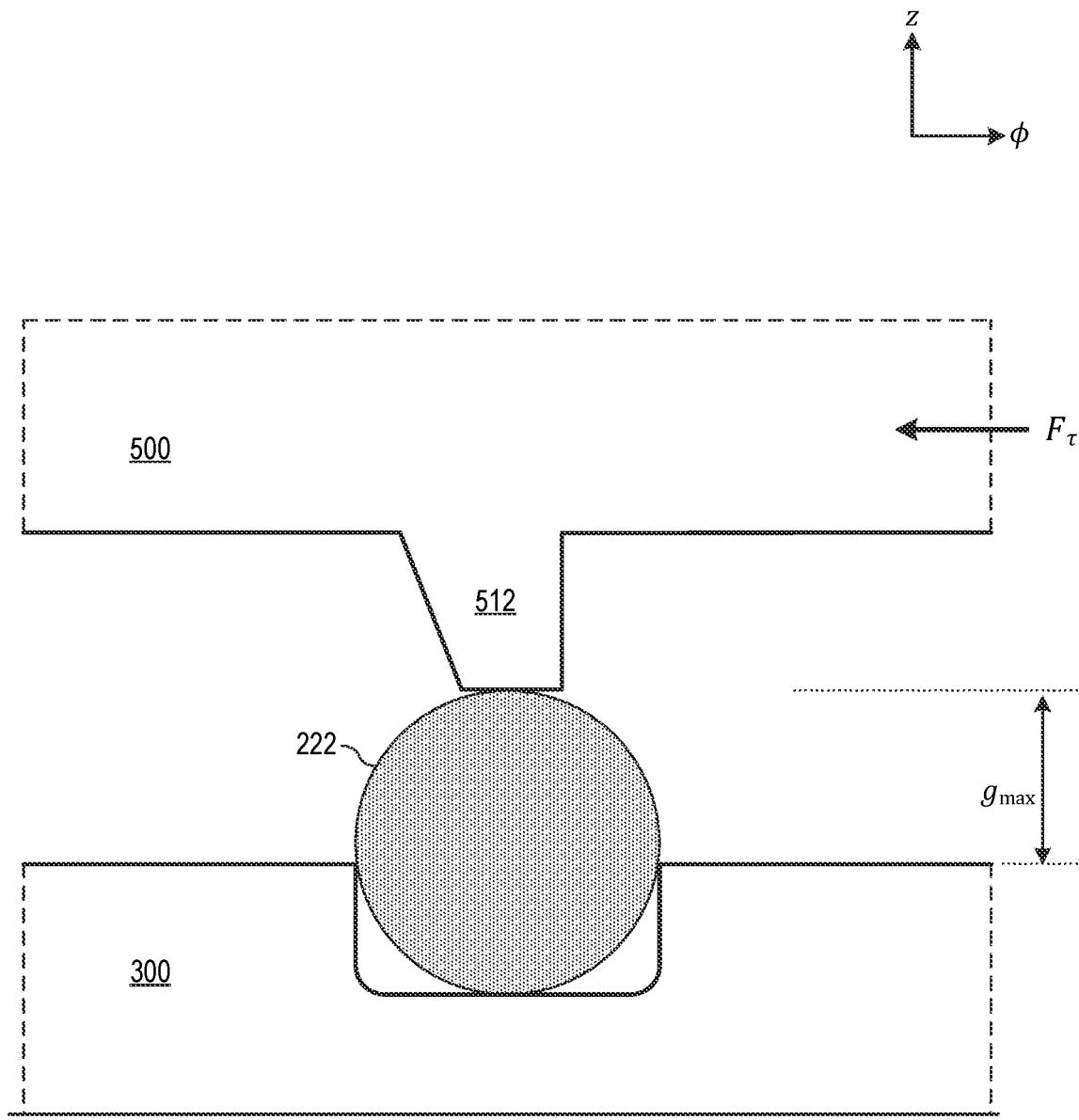
FIG. 10 shows the ridge on top of the ball bearing.

FIG. 10 shows the ridge 512 on top of the ball bearing 222. Here, the ridge 512 no longer acts like a wedge and the tangential force $F_\tau$ causes the ridge 512 to slide over the top of the ball bearing 222. When the ridge 512 is directly on top of the ball bearing 222, the bottom face 508 of the ridge 512 is separated from the top face 308 of the inner nut 300 by a maximum axial gap $g_{max}$. As discussed below with respect to FIGS. 12 and 13, this position results in the maximum compression of the wave spring 130.

Figure 11:
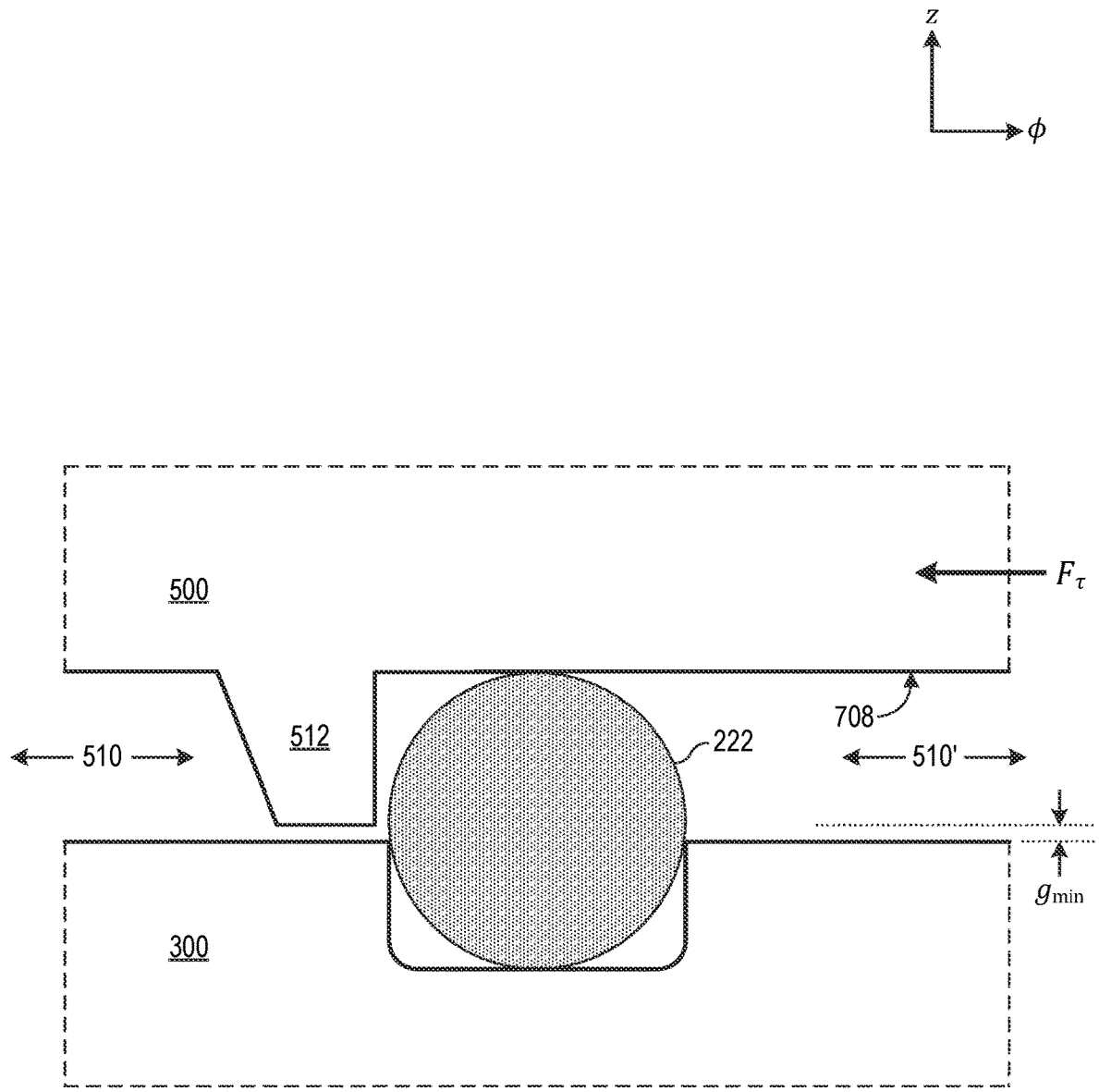
FIG. 11 shows the ridge after it has passed over the ball bearing.

FIG. 11 shows the ridge 512 after it has passed over the ball bearing 222. As the outer nut 500 is torqued starting from the orientation shown in FIG. 10, the ball bearing 222 will "snap back" into the next groove 510'. Specifically, the wave spring 130 will push the outer nut 500 downward until the ball bearing 222 contacts the recessed surface 708 of the next groove 510'. After this "snap back", the ball bearing 222 again behaves as shown in FIG. 7 and the wave spring 130 is no longer maximally compressed.

The smallest torque applied to the outer nut 500 that results in the situation shown in FIG. 10 is referred to herein as a limiting torque. Any torque applied to the outer nut 500 that exceeds the limiting torque is not transferred to the inner nut 300. Specifically, when the applied torque exceeds the limiting torque, the inner nut 300 is still torqued at the limiting torque. Thus, it is only the excess of the applied torque over the limiting torque that is not transferred to the inner nut 300.

Advantageously, the "snapping back" shown in FIG. 11 may produce an audible click that indicates to the user that an excessive torque exceeding the limiting torque was applied. A click may be produced each time any ridge 512 passes over any ball bearing 222. Thus, if the excessive torque is applied for an extended period of time, a series of rapid clicks will be generated. This audible effect is similar to that produced by torque limiters in power drills.

Figure 13:
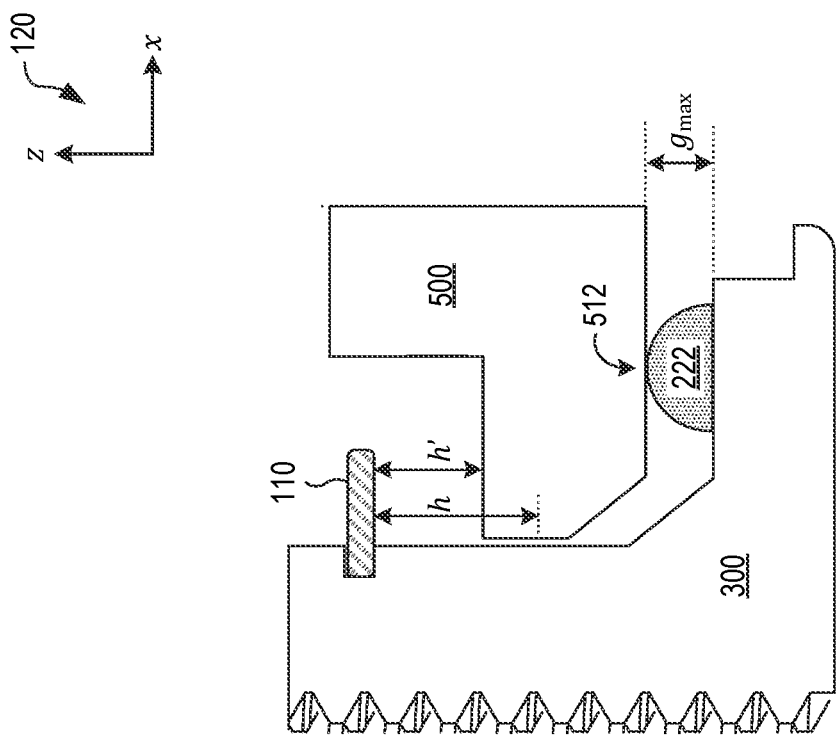
FIGS. 12 and 13 are side views illustrating axial movement of the outer nut relative to the inner nut when a ridge passes over a ball bearing.
Figure 12:
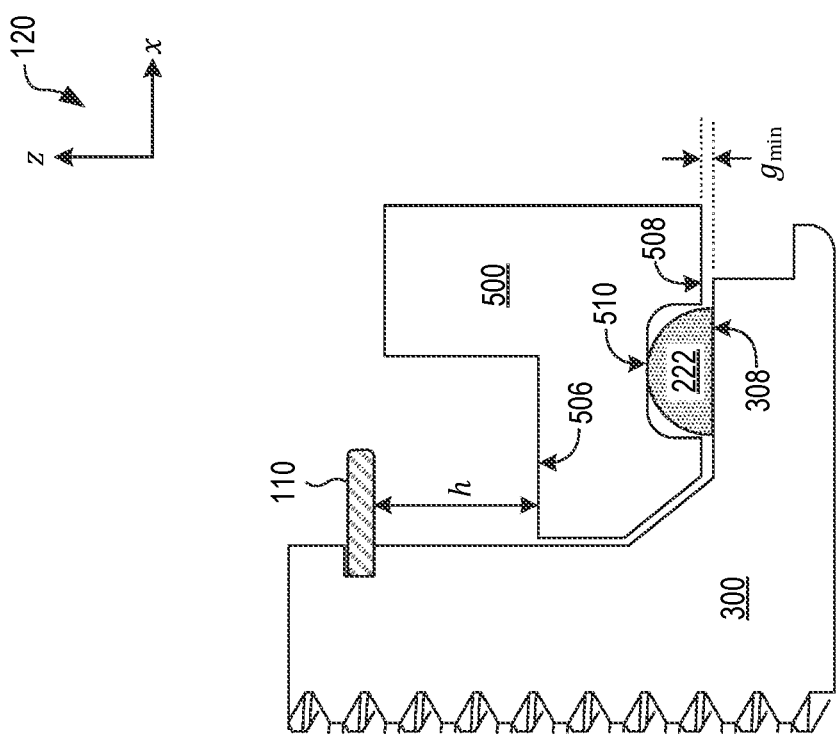

FIGS. 12 and 13 are side views illustrating axial movement of the outer nut 500 relative to the inner nut 300 when a ridge 512 passes over a ball bearing 222. For clarity, the wave spring 130 is not shown in FIGS. 12 and 13. In FIG. 12, the ball bearing 222 is inside the groove 510, corresponding to the situation shown in FIGS. 7, 8, and 11. In this case, the bottom of the retaining ring 110 is located a height h above the ledge 506. The bottom face 508 of the outer nut 500 is separated from the top face 308 of the inner nut 300 by the minimum axial gap $g_{min}$.

In FIG. 13, the outer nut 500 has been rotated with enough torque that the ridge 512 is on top of the ball bearing 222, corresponding to the situation shown in FIG. 10. In this case, the bottom of the retaining ring 110 is located a height h'<h above the ledge 506. The bottom face 508 of the outer nut 500 is separated from the top face 308 of the inner nut 300 by the maximum axial gap $g_{max}$. Compared to FIG. 12, the wave spring 130 will be additionally compressed in FIG. 13 by h−h'=$g_{max}$−$g_{min}$=d.

The limiting torque is determined in part by the front angle θ. For θ=90°, there is no axial component $F_z$ and all torque applied to the outer nut 500 is transferred to the inner nut 300. In this case, the limiting torque is essentially infinite and the torque-limiting axle nut 100 will not protect against excessive torque. As θ increases from 90° to 180°, the limiting torque is lowered.

The limiting torque is also determined in part by the axial depth d. As described above, the wave spring 130 is compressed by the axial depth d every time a ridge 512 passes over a ball bearing 222. Due to Hooke's law, compression by the axial depth d requires an increase in the axial component $F_n$, and therefore the normal force $F_n$. Therefore, an increase in the axial depth d causes the limiting torque to increase.

While FIGS. 8-11 illustrate torque limiting when tightening the torque-limiting axle nut 100, the same concept also applies when loosening the axle nut 100. In this case, the outer nut 500 moves left-to-right in these figures relative to the inner nut 300. As shown in FIG. 7, each ridge 512 also has a rear face 706 that forms a rear angle φ relative to the recessed surface 708. The torque applied to the outer nut 500 is transferred to the inner nut 300 via the ball bearing 222 when the rear face 706 contacts the ball bearing. Similar to the situation shown in FIG. 8, this causes the outer nut 500 and inner nut 300 to co-rotate, thereby loosening the axle nut 100.

In FIG. 7, the rear angle φ is 90°. In this case, there is no torque-limiting when loosening the torque-limiting axle nut 100. Alternatively, the rear angle φ may be obtuse, similar to θ. In this case, an excessive torque applied to the outer nut 500 when loosening the torque-limiting axle nut 100 will cause the ridge 512 to pass up and over the ball bearing 222 (i.e., "snapping back"), but in the opposite direction to that shown in FIGS. 8-11. To ensure that the axle nut 100 can be loosed, the limiting torque for loosening the axle nut 100 should be greater than that for tightening.

When the torque-limiting axle nut 100 is fully threaded on the axle 200, the wave spring 130 is not compressed enough to provide an axial load that is sufficient to keep the torque-limiting axle nut 100 secured to the axle 200. As known by those trained in the art, an axial load ensures that the threads of a nut (e.g., the torque-limiting axle nut 100) push against the threads of an axle (e.g., the axle 200) with enough force to resist rotation of the nut. This resistance to rotation is particularly important for vehicles like trucks and trains where motion and vibration can generates torques that cause the nut to loosen over time.

To understand this need to resist rotation in more detail, consider when the torque-limiting axle nut 100 is fully torqued around the axle 200. In this case, the bottom face 312 of the inner nut 300 would directly contact an end surface 204 of the axle 200. As the axle nut 100 is tightened and the bottom face 312 is increasingly pushed downward against the end surface 204, the axle 200 responds by applying an upward normal force to the inner nut 300. This normal force gives rise to a friction force between the bottom face 312 and the end surface 204. However, the friction force will decrease over time as motion and vibration causes the bottom face 312 and end surface 204 to rub against each other and erode, thereby reducing the coefficient of friction. In addition, the wheel end will likely have oil, which can also reduce the coefficient of friction. As the friction force is reduced, it is only a matter of time before a vibration creates a torque large enough to overcome the reduced friction force, thereby completely loosening the axle nut 100.

In some embodiments, the torque-limiting axle nut 100 includes a washer that is placed between the axle 200 and the bottom face 312 of the inner nut 300. As the axle nut 100 is tightened, the inner nut 300 increasingly presses against the washer to compress it, thereby providing an axial load that keeps the axle nut 100 secured to the axle 200. The washer may be a Belleville washer, split washer, spring lock washer, wave washer, disc spring, or another type of axially compressible ring-shaped component know in the art. The washer may also have a key that engages with a slot of the axle 200 to prevent the washer from rotating relative to the axle 200. When using the axle nut 100, the maximal axial load that can be applied will be determined by the torque threshold. Thus, if a certain axial load is targeted (e.g., 1000 lb), then the axle nut 100 should be designed such that it can produce the targeted axial load at, or near, the torque threshold.

While the washer can help resist rotation of the torque-limiting axle nut 100, it has the same problem, as described above, when the bottom face 312 and end surface 204 directly contact each other. Specifically, the washer is held in place against the bottom face 312 and end surface 204 via friction forces. Therefore, wear-and-tear will eventually cause these friction forces to reduce over time, thereby increasing the possibility that a vibration will create a torque large enough to overcome these reduced friction force, thereby completely loosening the axle nut 100.

In other embodiments, the torque-limiting axle nut 100 includes a locator plate 1400 and a plurality of spring plungers 1402 that cooperatively provide part of an axial load that secures the axle nut 100 to the axle 200. As shown in FIGS. 1 and 2, the locator plate 1400 is located between the bottom face 312 of the inner nut 300 and the end surface 204 of the axle 200. For clarity, the spring plungers 1402 are not shown in FIGS. 1 and 2. Advantageously, the locator plate 1400 establishes a minimum non-zero torque needed to loosen the inner nut 300. As described in more detail below, this minimum non-zero torque is not established by a friction force that can decrease over time. Accordingly, these embodiments provide better long-term resistance to rotation, as compared to embodiments without the locator plate 1400 and spring plungers 1402.

Figure 14:
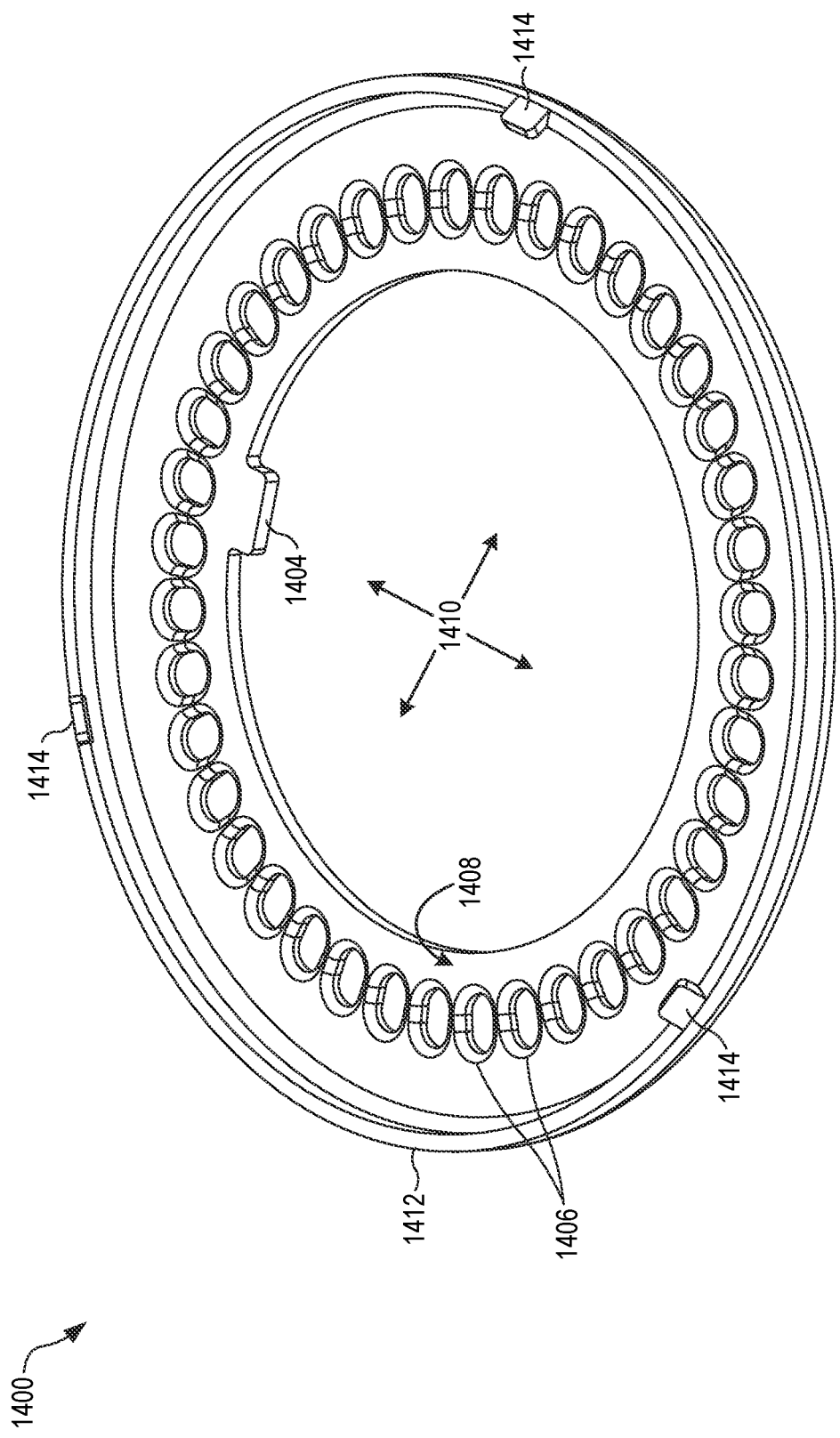
FIG. 14 shows a locator plate of the torque-limiting axle nut of FIG. 1.

FIG. 14 shows the locator plate 1400 in more detail. The locator plate 1400 is ring shaped, forming an unthreaded center hole 1410 whose diameter is slightly larger than that of the axle 200. The locator plate 1400 forms a plurality of detent holes 1406 at various azimuthal locations. The detent holes 1406 are centered identically at the same radial distance from the rotation axis 190. Each detent hole 1406 extends axially downward from a top face 1408 of the locator plate 1400. The edges of each detent hole 1406 are filleted or chamfered. The angle formed by the fillets/chamfers relative to the top face 1408 establish, in part, how much torque can be applied before the axle nut 100 becomes loose (see the minimum loosening torque discussed below). In one embodiment, the locator plate 1400 forms a key 1404 that is shaped to engage with an axial slot of the axle 200 (not shown in the figures) to prevent rotation of the locator plate 1400 relative to the axle 200.

In FIG. 14, the detent holes 1406 are all shaped as countersunk stadiums. However, one or more of the detent holes 1406 may alternatively have a different shape (e.g., a countersunk circular hole). Similarly, the detent holes 1406 are shown in FIG. 14 as being uniformly spaced around the rotation axis 190 (i.e., azimuthally). However, the detent holes 1406 may alternatively be non-uniformly spaced around the rotation axis 190. While FIG. 14 shows the locator plate 1400 with 40 detent holes 1406, the locator plate 1400 may have a different number of detent holes 1406 without departing from the scope hereof.

Figure 15:
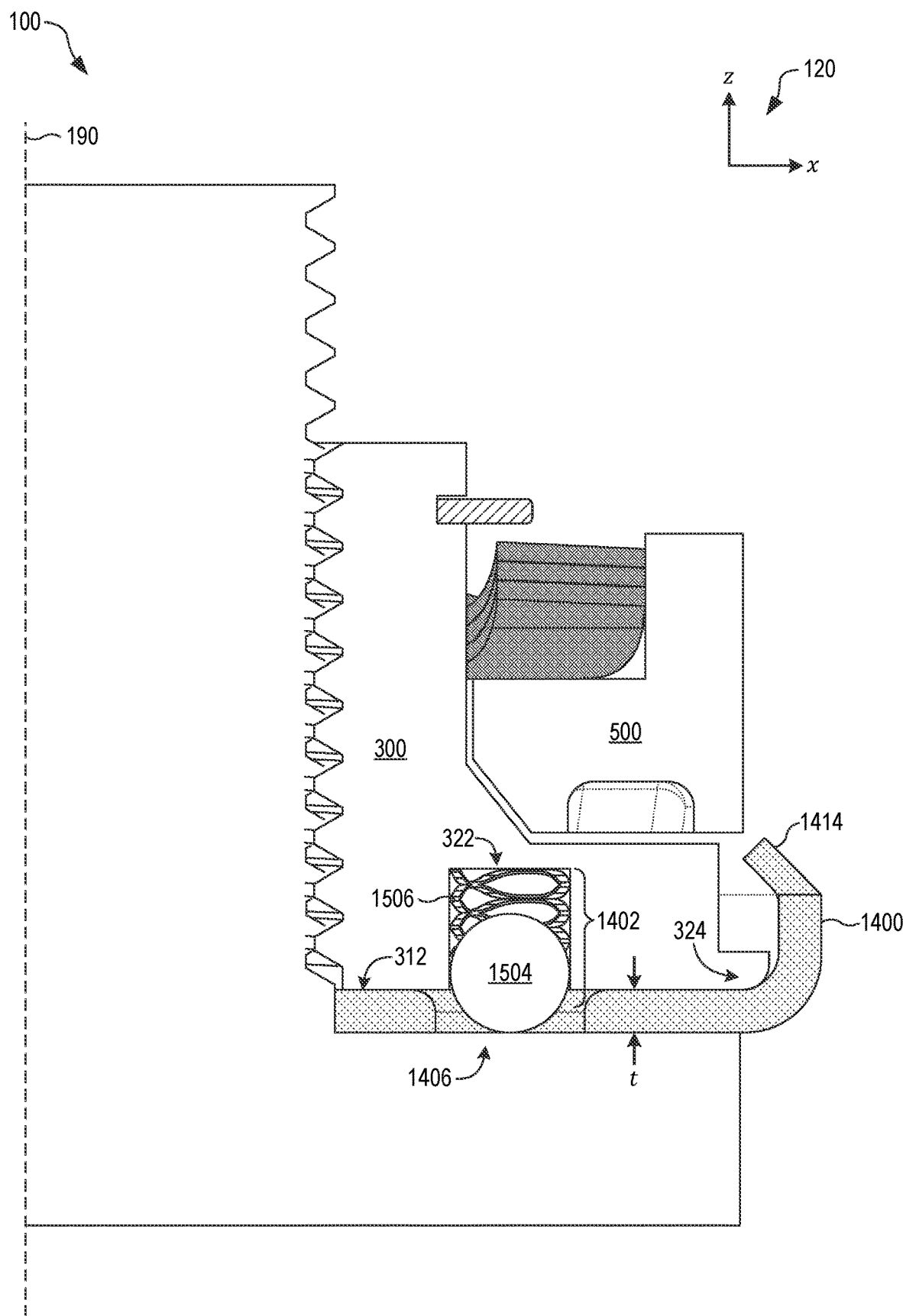
FIG. 15 is a side cross-sectional view of the torque-limiting axle nut of FIG. 1 that illustrates operation of the locator plate of FIG. 14.

FIG. 15 is a side cross-sectional view of the torque-limiting axle nut 100 of FIG. 1 that illustrates operation of the locator plate 1400 of FIG. 14. In FIG. 15, a spring plunger 1402 is located inside one of a plurality of plunger mounting holes 322. As shown in FIG. 4, the plunger mounting holes 322 extend upward from the bottom face 312 of the inner nut 300. Each plunger mounting hole 322 is sized to accept one spring plunger 1402. In the example of FIG. 15, the spring plunger 1402 includes a spring 1506 that pushes downward against a contact 1504 such that the contact 1504 engages with one detent hole 1406 when the contact 1504 is positioned over the detent hole 1406. In the example of FIG. 15, the contact 1504 is a ball bearing. However, the contact 1504 may be a different component that can engage with the detent holes 1406, such as a pin. Also in FIG. 15, the spring 1506 is shown as a disc spring. However, the spring 1506 may alternatively be a Belleville washer, wave spring, helical spring, or other type of spring.

The spring plungers 1402 cooperate with the detent holes 1406 to create a detent mechanism that arrests motion of the inner nut 300 while it is being tightened onto the axle 200. As the inner nut 300 rotates with respect to the locator plate 1400, the contact 1504 engages with one or more of the detent holes 1406. Specifically, consider a contact 1504 initially engaged with a detent hole 1406 when the torque-limiting axle nut 100 is near the bottom of the axle 200. Due to the chamfering of the detent hole 1406, rotation of the inner nut 300 pushes the contact 1504 upward to compress the spring 1506. As the rotation continues and the contact 1504 enters the next detent hole 1406, the spring 1506 decompresses, resulting in a "snapping back" effect similar to that described above for FIG. 11. Thus, as the inner nut 300 rotates, the contact 1504 will produce an audible click for each of the detent holes 1406 it engages with.

Assuming that the detent holes 1406 are uniformly spaced around the rotation axis 190, the azimuthal angle $\phi_n$ between a neighboring pair of the detent holes 1406 is $\phi_n = 360°/N$, wherein N is the number of the detent holes 1406. In the example of FIG. 14, where N is 40, the azimuthal angle $\phi_n$ is 9°. In the example FIG. 4, the inner nut 300 has two plunger mounting holes 322, and therefore two spring plungers 1402, that are azimuthally separated from each other by a neighboring-plunger angle of $\phi_{np} = 175.5°$ (and the corresponding conjugate angle of 184.5°), which is divisible by $\phi_n/2$. Thus, at most only one of the two spring plungers 1402 engages with a detent hole 1406. As the inner nut 300 rotates, the one spring plunger 1402 engaged with a detent hole 1406 alternates back-and-forth between the two spring plungers 1402. Thus, by azimuthally offsetting the two plungers 1402 from each other in this manner, the minimum rotation angle $\phi_m$ of the inner nut 300 that creates one audible click is reduced by half to $\phi_m = \phi_n/2 = 4.5°$.

This concept of reducing the minimum rotation angle $\phi_m$ can be extended to more than two spring plungers 1402 to reduce the minimum rotation angle $\phi_m$. For example, consider when the inner nut 300 has four spring plungers 1402, each being azimuthally separated from its nearest neighbors by a neighboring-plunger angle $\phi_{np}$ that is divisible by four (e.g., the plunger mounting holes 322 are located at azimuthal angles of 0°, 87.75°, 175.5°, and 263.25°). Again, at most only one of the four spring plungers 1402 engages with a detent hole 1406. As the inner nut 300 rotates, the one spring plunger 1402 that is engaged with a detent hole 1406 changes cyclically between the four spring plungers 1402. In this example, the minimum rotation angle $\phi_m$ of the inner nut 300 that creates one audible click is reduced by a factor of four to $\phi_m = \phi_n/4 = 2.25°$.

In general, the inner nut 300 may form any integer number M of two or more plunger mounting holes 322 where each is azimuthally separated from its two nearest neighbors by a neighboring-plunger angle $\phi_{np}$ that is divisible by $\phi_n/M$. In this case, the inner nut 300 can accommodate up to M spring plungers 1402 and the minimum rotation angle $\phi_m$ of the inner nut 300 is reduced by a factor of M to $\phi_m = \phi_n/M$. Note that the neighboring-plunger angles $\phi_{np}$ do not have to be identical, provided that each is divisible by $\phi_n/M$.

In one embodiment, the inner nut 300 forms only one plunger mounting hole 322, in which case the torque-limiting axle nut 100 has only one spring plunger 1402 and the minimum rotation angle Øm equals Øn. In other embodiments, multiple spring plungers 1402 are azimuthally positioned such that their contacts 1504 engage with multiple detent holes 1406 simultaneously. In this case, the spring plungers 1402 will click simultaneously as the inner nut 300 rotates.

Before the torque-limiting axle nut 100 is fully torqued, the contact 1504 will extend past the bottom of the locator plate 1400. In this position, the spring 1506 is relaxed. As the axle nut 100 approaches the end of its travel, the contact 1504 will be pushed upward by the end surface 204, thereby compressing the spring 1506. At this point, the inner nut 300 will only be rotatable by a small additional angle (e.g., 10° or less) before the torque limit is reached. For this reason, it may be beneficial for the locator plate 1400 to form as many detent holes 1406 as possible. This reduces the angle $\phi_n$, ensuring that after the inner nut 300 is rotated by the small additional angle, there is at least one spring plunger 1402 aligned with a detent hole 1406. By contrast, when the angle $\phi_n$ is relatively large, the torque limit may be reached when all of the spring plungers 1402 are located between detent holes 1406. In this latter case, none of the spring plungers 1402 will engage with the detent holes 1406.

When the torque-limiting axle nut 100 is fully torqued, most of the axial force may be thought of as having a friction component and a spring component. Most of the axial force is the friction component, which is established by friction between the locator plate 1400 and the bottom face 312 of the inner nut 300. The remaining spring component, however, is established by the compression of the spring 1506 and therefore is not a friction-based force. A vibration can only loosen the axle nut 100 if it generates a torque large enough to compress the spring 1506 by a thickness t of the locator plate 1400. The smallest such torque is referred to herein as a "minimum loosening torque" and its magnitude depends on the angle formed by the chamfered edges of the detent holes 1406. When the vibration gives rise to a torque that is greater than the minimum loosening torque, rotation of the inner nut 300 relative to the locator plate 1400 compresses the spring 1506 such that the inner nut 300 can rotate. In this case the contact 1504 will "snap back" into the next detent hole 1406 after the inner nut 300 has been rotated by $\phi_m$.

Advantageously, the spring component of the axial force does not rely on friction and therefore will not degrade over time in response to normal wear-and-tear. Note that the friction component of the axial force will be reduced due to abrasion between the locator plate 1400 and bottom 312. However, even if the friction component is reduced to a small fraction of its initial value, the minimum loosening torque will not be reduced over time. The value of the minimum loosening torque may be selected to ensure that the torque-limiting axle nut 100 will not become completely detached from the axle 200, even if the friction component is zero.

As a quantitative example, the torque-limiting axle nut 100 may be designed such that at a limiting torque of 100 ft·lb, the axial force is 1000 lb. The frictional component may constitute 950 lb of axial force. Compression of the spring 1506 may provide another 20 lb of axial force. When there are two spring plungers 1402 (e.g., see FIG. 4) and only the first is engaged with a detent hole 1406, the second will be additionally compressed by the thickness t of the locator plate 1400. In this case, the second spring plunger 1402 may provide the remaining 30 lb of axial force. Since this second spring plunger 1402 is not engaged with a detent hole 1406, its axial force does not contribute to the minimum loosening torque.

In some embodiments, the locator plate 1400 and spring plungers 1402 are unitized with the rest of the torque-limiting axle nut 100 to ensure that the locator plate 1400 and inner nut 300 do not become axially separated to the point where the contact 1504 can fall out. The locator plate 1400 may contain features to simplify assembly of the axle nut 100 into a unitized device. For example, in FIG. 14 the locator plate 1400 has a wall 1412 that encircles the top face 1408 and extends axially upwards. At the top of the wall 1412 are a plurality of tabs 1414. After the axle nut 100 is assembled, each tab 1414 may be bent radially inward to overlap a lip 324 of the inner nut 300 (see FIG. 15). As another example, the upper portion of the wall 1412 is bent radially inward via roll-forming. This creates an upper lip at the top of the wall 1412 that extends continuously around the entire locator plate 1400. The upper lip may be "crimped" radially inward enough to overlap the lip 324, thereby achieving unitization.

Figure 16:
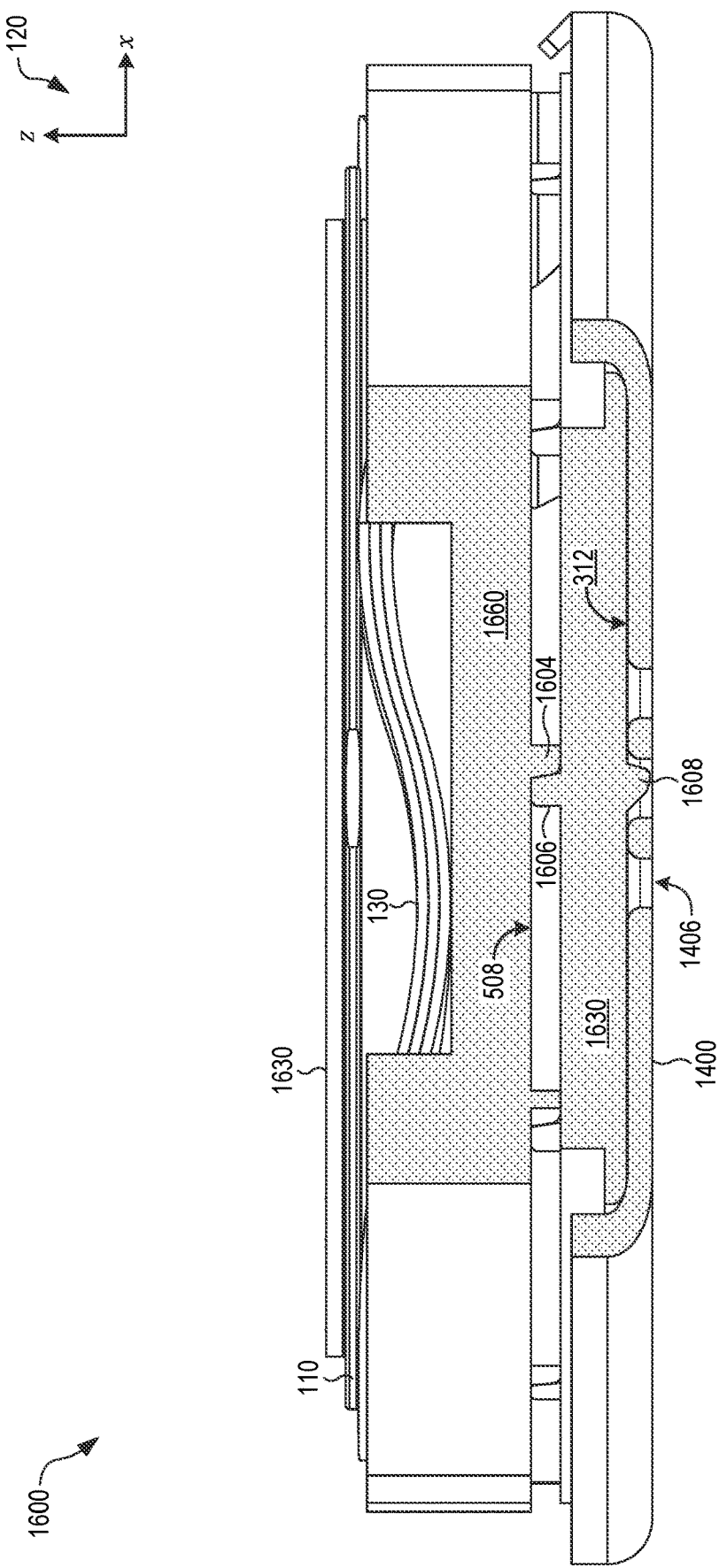
FIG. 16 is a side cross-sectional view of a torque-limiting axle nut that is similar to the torque-limiting axle nut of FIG. 1, in embodiments.

FIG. 16 is a side cross-sectional view of a torque-limiting axle nut 1600 that is similar to the torque-limiting axle nut 100 of FIG. 1. For clarity in FIG. 16, the cross-section does not pass through the rotational axis 190. The axle nut 1600 includes an inner nut 1630 that is similar to the inner nut 300 of FIGS. 1-4 except it forms a plurality of upward nubs 1606 that extend axially upward from the top face 308 of the flange 304. The upward nubs 1606 replace the recesses 306. The axle nut 1600 also includes an outer nut 1660 that is similar to the outer nut 500 of FIGS. 1-2 and 5-6 except that it forms a plurality of downward nubs 1604 that extend axially downward from the bottom face 508.

The downward nubs 1604 are functionally similar to the ridges 512 except that they are not defined by grooves 510 (see FIG. 6). The upward nubs 1606 are functionally similar to the ball bearings 222 (see FIG. 2) except that they cannot rotate. Accordingly, contact between the upward nubs 1606 and downward nubs 1604 will generate abrasion, as compared to the contact between the ball bearings 222 and ridges 512 (see FIGS. 8-10). Although this increased abrasion will cause the nubs 1604 and 1606 to wear out faster, the upward nubs 1606 are integral to the inner nut 300, which simplifies assembly and unitization of the torque-limiting axle nut 1600.

Figure 17:
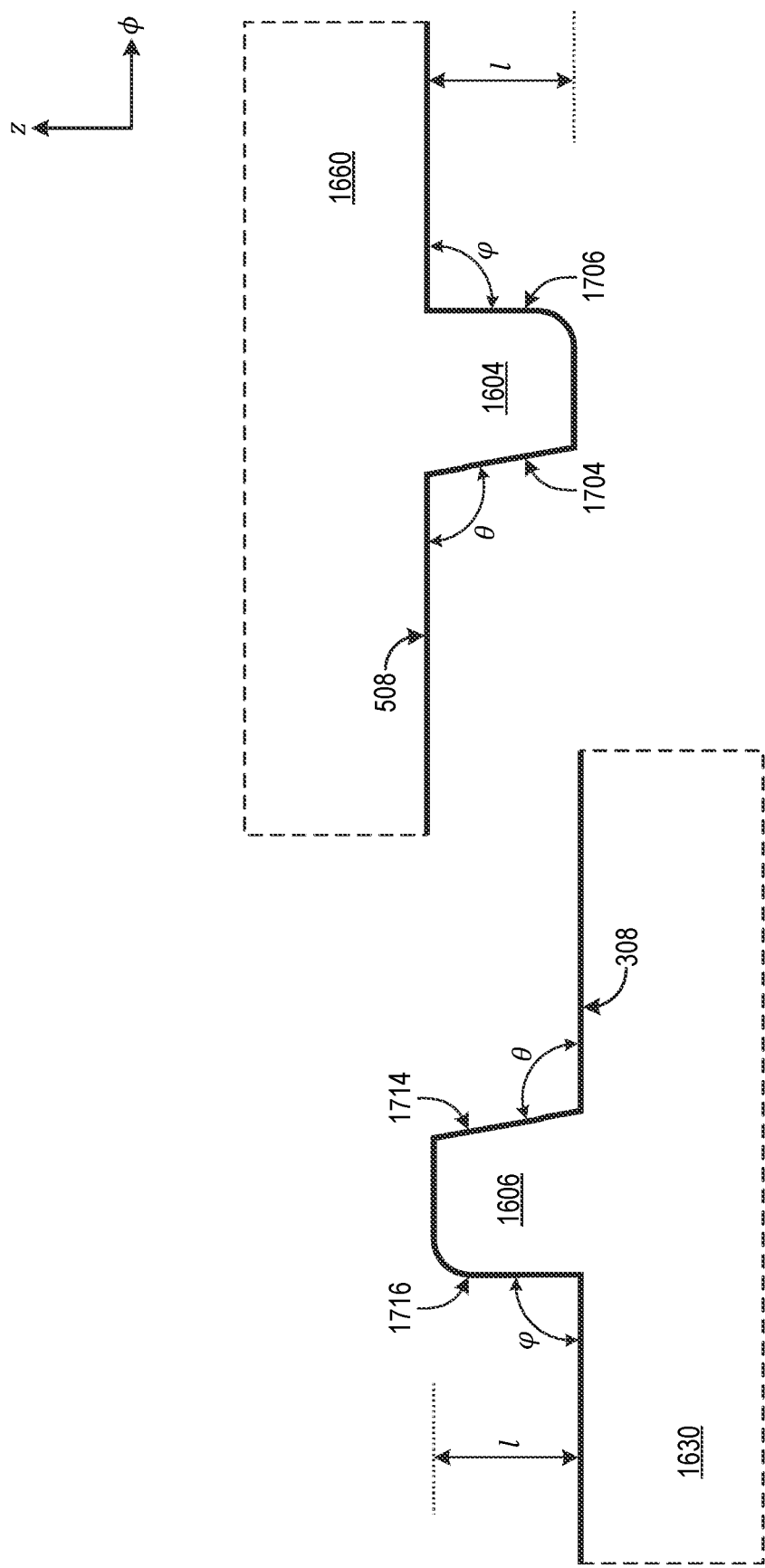
FIG. 17 shows one downward nub and one upward nub of the torque-limiting axle nut of FIG. 16.

FIG. 17 shows one downward nub 1604 and one upward nub 1606 in more detail. The downward nub 1604 has a front face 1704 that is similar to the front face 704 of the ridge 512 (see FIG. 7) in that it forms an oblique front angle θ with respect to the bottom face 508. Similarly, the downward nub 1604 has a rear face 1706 that is similar to the rear face 706 of the ridge 512 in that it forms a rear angle φ with respect to the bottom face 508. The rear angle φ may be right (as shown) or oblique. Similarly, the upward nub 1606 has a front face 1714 that forms the oblique front angle θ with respect to the top face 308 of the inner nut 300. The upward nub 1606 also has a rear face 1716 that forms the rear angle φ with respect to the top face 308.

When tightening the torque-limiting axle nut 1600, the front faces 1704 and 1714 will eventually contact each other and slide against each other as the downward nub 1604 moves up and over the upward nub 1606. The limiting torque is determined, in part, by the front angle θ and a height l of the nubs 1604 and 1606. When loosening the axle nut 1600, the rear faces 1706 and 1716 will contact each other and slide against each other. In this case, a limiting torque can be set by making the rear angle φ oblique. In one embodiment, the rear angle φ is 90°. In this embodiment, there is no torque limiting when loosening the axle nut 1600.

As shown in FIG. 16, the torque-limiting axle nut 1600 may further include the locator plate 1400 to establish an axial force for resisting rotation once the axle nut 1600 is fully tightened. In one of these embodiments, the inner nut 1630 includes the spring plungers 1402 for engaging with the detent holes 1406 (see FIG. 15). In another of these embodiments, and shown in FIG. 16, the inner nut 1630 forms locator nubs 1608 that extend axially downward from the bottom face 312. For clarity, only one locator nub 1608 is shown in FIG. 16. Each locator nub 1608 is sized and radially located to engage with the detent holes 1406 as the inner nut 1630 rotates with respect to the locator plate 1400. Because the locator nubs 1608 are integral to the inner nut 1630, they cannot be axially compressed. As a result, once the axle nut 1600 (with locator nubs 1608) is tightened, it cannot be subsequently loosened. Therefore, this embodiment may be useful for applications where the axle nut 1600, once tightened, never needs to be loosened.

Figure 18:
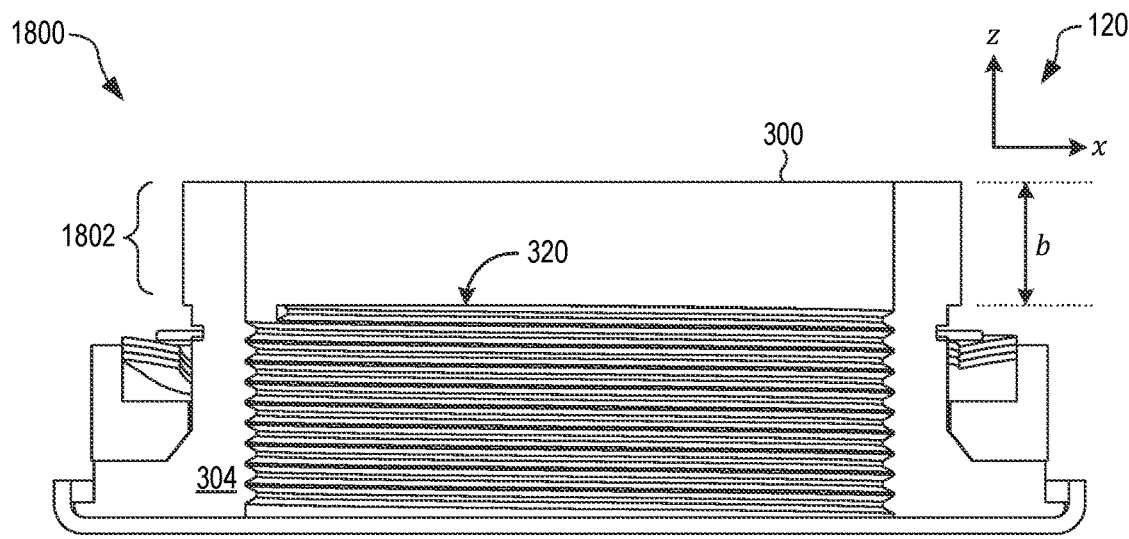
FIG. 18 is a side cross-sectional view of a torque-limiting axle nut that is similar to the torque-limiting axle nut 100 of FIG. 1, in embodiments.
Figure 19:
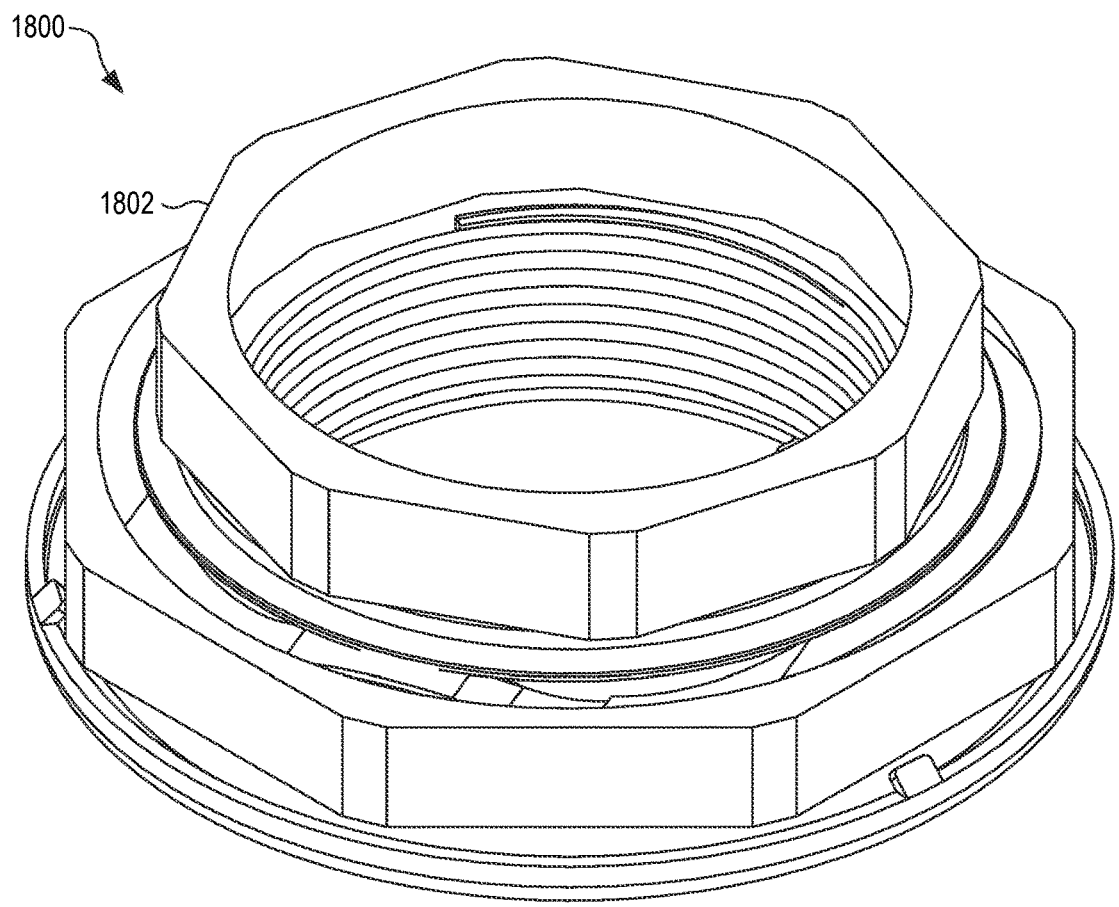
FIG. 19 is a perspective view of the torque-limiting axle nut of FIG. 18.

FIG. 18 is a side cross-sectional view of a torque-limiting axle nut 1800 that is similar to the torque-limiting axle nut 100 of FIG. 1 except that the inner nut 300 has an extended portion 1802 that extends axially upward from the inner-nut body 302. FIG. 19 is a perspective view of the torque-limiting axle nut 1800 of FIG. 18. FIGS. 18 and 19 are best viewed together with the following description.

Unlike the inner-nut body 302, the extended portion 1802 of the inner nut 300 is not internally threaded. As shown in FIG. 18, the extended portion 1802 may be externally shaped as a polygon (e.g., hexagon, octagon, etc.). The extended portion 1802 has an height b that is large enough for a wrench to engage with the extended portion 1802. In an alternative embodiment, the inner nut 1630 (see FIG. 16) extends axially upward to form the extended portion 1802.

The torque-limiting axle nut 1800 is convenient for applications where an initial torque used to seat the bearing is greater than the final installation torque. For example, a bearing-seating torque of 200 lb·ft may be used to seat the bearing, but the final installation torque only needs to be 100 lb·ft. In this case, a torque wrench can be used with the extended portion 1802 to apply the bearing-seating torque. After the bearing is seated, the axle nut 1800 can be loosened, again using a wrench that only engages with the extended portion 1802. Finally, the outer nut 500 can be torqued to the final installation value without a torque wrench, as described above (i.e., using a conventional wrench that engages with the outer nut 500).

Figure 20:
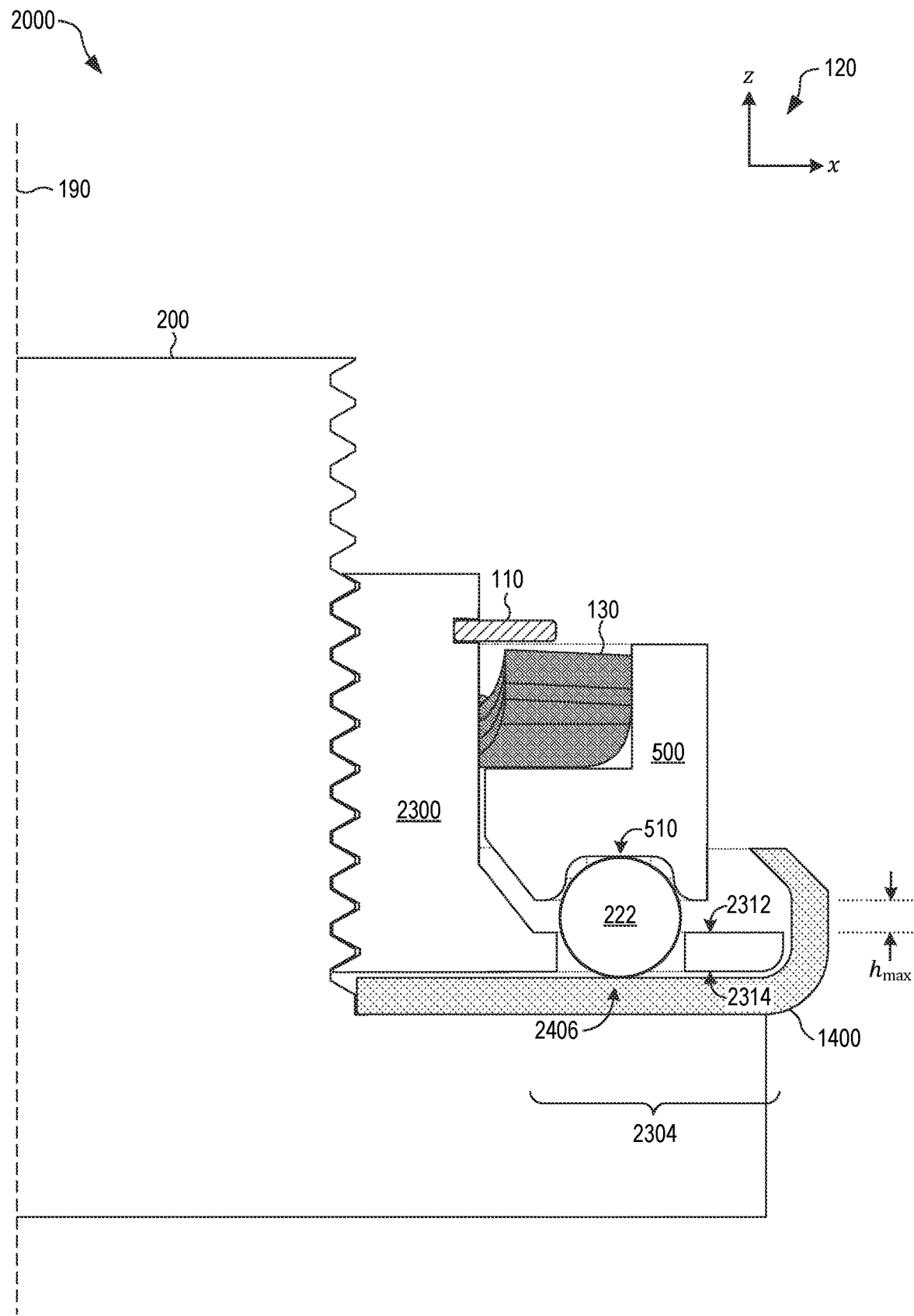
FIG. 20 is a side cross-sectional view of a torque-limiting axle nut that is similar to the torque-limiting axle nut of FIG. 1, in embodiments.
Figure 21:
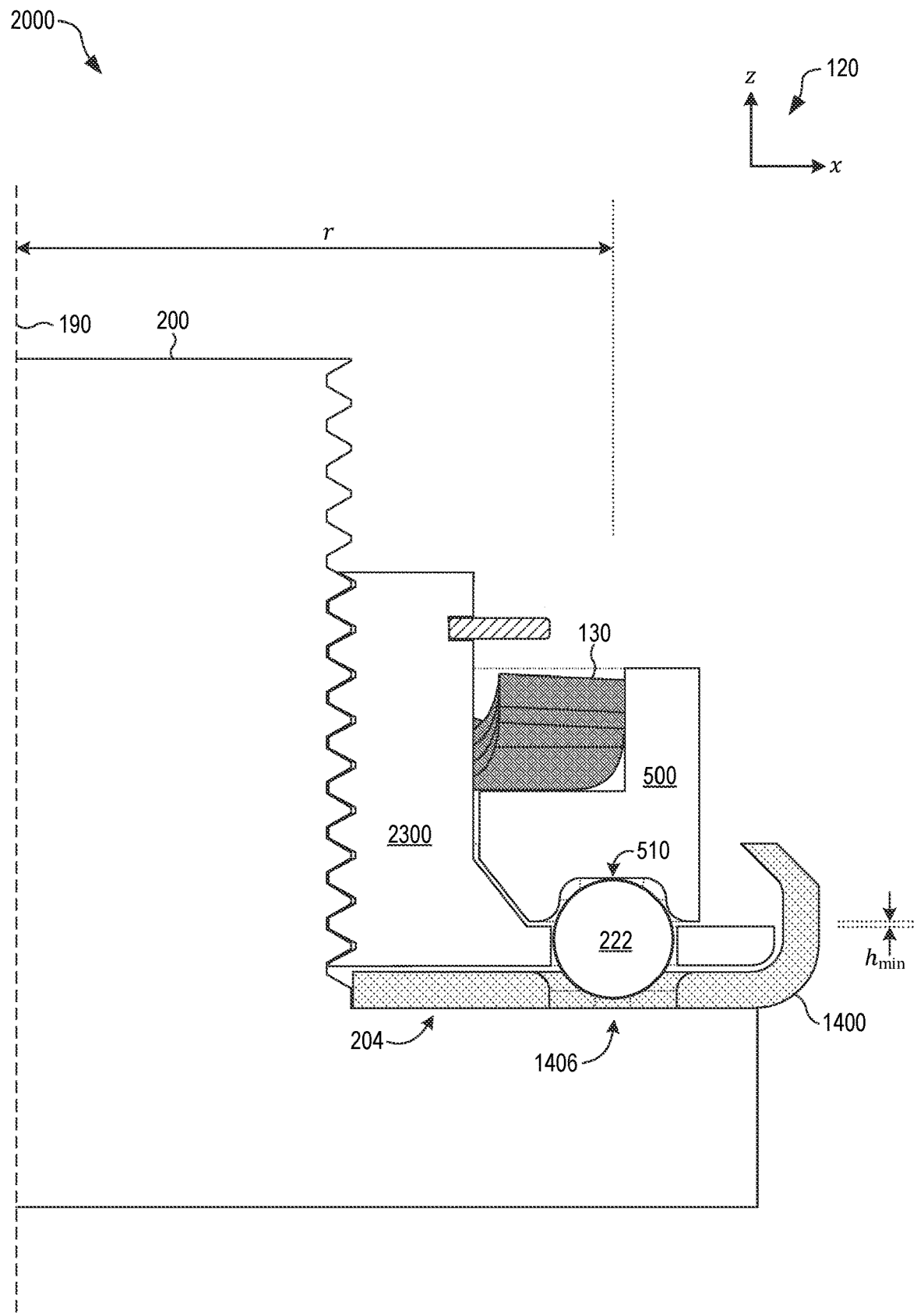
FIG. 21 is another side cross-sectional view of the torque-limiting axle nut of FIG. 20.

FIGS. 20 and 21 are side cross-sectional views of a torque-limiting axle nut 2000 that is similar to the torque-limiting axle nut 100 of FIG. 1 except that it uses an inner nut 2300 instead of the inner nut 300. The inner nut 2300 is similar to the inner nut 300 except that it has a flange 2304 that is thinner (along z) than the flange 304 (see FIGS. 3 and 4). Furthermore, the inner nut 2300 does not form any of the mounting holes 322. Instead, the flange 2304 forms recesses 2406 that are similar to the recesses 306 of FIG. 3 except that they are through holes passing entirely through the flange 2304. The thickness of the flange 2304 is less than the diameter of the ball bearing 222. As a result, when the ball bearing 222 is in a recess 2406, it can extend past both a top face 2312 of the flange 2304 and a bottom face 2314 of the flange 2304.

FIG. 20 shows the torque-limiting axle nut 2000 when the ball bearing 222 is between a pair of neighboring detent holes 1406 of the locator plate 1400 (see FIG. 14). In this case, the bottom of the ball bearing 222 contacts the top face 1408 of the locator plate 1400. The top of the ball bearing 222 sits inside one groove 510 of the outer nut 500, pushing the outer nut 500 upward to compress the wave spring 130 against the retaining ring 110. In this position, the bottom of the outer nut 500 (see bottom face 508 in FIG. 5) and the top face 2312 of the flange 2304 are separated by a maximum gap $h_{max}$.

FIG. 21 shows the torque-limiting axle nut 2000 when the ball bearing 222 is fully seated inside a detent hole 1406. In this case, the ball bearing 222 has moved axially downward. The wave spring 130 pushes the outer nut 500 downward, thereby decreasing the force in the wave spring 130. Due to the chamfered edges of the detent hole 1406, the bottom of the ball bearing 222 does not extend past the bottom face of the locator plate 1400. Accordingly, the ball bearing 22 does not directly contact the end surface 204 of the axle. Due to the downward movement of the ball bearing 222 into the detent hole 1406, the bottom of the outer nut 500 and the top face 2312 of the flange 2304 are separated by a minimum gap $h_{min}$ that is less than the maximum gap $h_{max}$. The thickness of the flange 2304, diameter of the ball bearing 222, and depth of the groove 510 may be selected such that $h_{min}$ is greater than zero, which ensures that the outer nut 500 and inner nut 300 do not directly contact each other.

FIG. 21 also shows the recesses 2406, detent holes 1406, and grooves 510 are all centered at the same radial distance r from the rotation axis 190. Accordingly, the ball bearing 222, when located in its corresponding recess 2406, will also be centered at approximately the same distance r from the rotation axis. This configuration ensures that the top portion of the ball bearing 222 can engage with all of the grooves 510 as the outer nut 500 rotates relative to the inner nut 300, and that the bottom of ball bearing 222 can engage with detent holes 1406 as the inner nut 300 rotates relative to the locator plate 1400.

The torque-limiting axle nut 2000 provides the same advantages as the torque-limiting axle nut 100 of FIG. 1, including the establishment of a limiting torque and minimum loosening torque. However, the axle nut 2000 advantageously excludes the spring plungers 1402 (e.g., the contact 1504 and spring 1506 in FIG. 15). As a result, the axle nut 2000 is easier to assemble than the axle nut 100. Furthermore, the inner nut 2300 excludes the plunger mounting holes 322, making it simpler to fabricate (e.g., less machining) than the inner nut 300.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A torque-limiting axle nut includes an inner nut having an inner-nut body forming a threaded center hole that defines a rotation axis. The inner nut also has a flange located azimuthally around the inner-nut body and extending radially away from the inner-nut body. The flange forms a plurality of recesses. The torque-limiting axle nut also includes a retaining ring located azimuthally around the inner-nut body and an outer nut located azimuthally around the inner-nut body. The outer nut forms a plurality of grooves that (i) extend axially upward from a bottom face of the outer nut and (ii) extend azimuthally around the rotation axis. For each pair of neighboring grooves of the plurality of grooves, the outer nut forms a ridge that separates the neighboring grooves of said each pair. The torque-limiting axle nut also includes a wave spring located azimuthally around the inner-nut body. The wave spring is located axially between the retaining ring and a top face of the outer nut. The torque-limiting axle nut also includes a plurality of ball bearings seated in the plurality of recesses and extending into the plurality of grooves.

(A2) In the torque-limiting axle nut denoted (A1), the ridge has a front face that forms an obtuse angle with respect to a recessed surface of a first groove of said each pair of neighboring grooves.

(A3) In either of the torque-limiting axle nuts denoted (A1) and (A2), the ridge has a rear face that forms a right angle or an obtuse angle with respect to a recessed surface of a second groove of said each pair of neighboring grooves.

(A4) In any of the torque-limiting axle nuts denoted (A1) to (A3), the ridge has a bottom face that lies flush with the bottom face of the outer nut.

(A5) In any of the torque-limiting axle nuts denoted (A1) to (A4), the plurality of ball bearings identically have a ball-bearing diameter. The plurality of grooves identically have a radial width that is larger than the ball-bearing diameter.

(A6) In any of the torque-limiting axle nuts denoted (A1) to (A5), the inner-nut body has a top face and a bottom face, the bottom face of the inner-nut body lying parallel to the top face of the inner-nut body and axially beneath the top face of the inner-nut body. The outer nut is fully located between the top and bottom faces of the inner-nut body.

(A7) In any of the torque-limiting axle nuts denoted (A1) to (A6), a bottom face of the flange lies flush with a bottom face of the inner-nut body.

(A8) In any of the torque-limiting axle nuts denoted (A1) to (A7), the outer nut is shaped as a polygon.

(A9) In the torque-limiting axle nut denoted (A8), the polygon is a regular octagon or a regular hexagon.

(A10) In any of the torque-limiting axle nuts denoted (A1) to (A9), the plurality of upper ball-bearing holes are centered identically at a radial distance from the rotation axis.

(A11) In the torque-limiting axle nut denoted (A10), the plurality of grooves are centered identically at the radial distance.

(A12) In any of the torque-limiting axle nuts denoted (A1) to (A11), the plurality of grooves extend identically around the rotation axis by an azimuthal range.

(A13) In any of the torque-limiting axle nuts denoted (A1) to (A12), the plurality of upper ball-bearing holes are uniformly spaced around the rotation axis.

(A14) In any of the torque-limiting axle nuts denoted (A1) to (A13), the torque-limiting axle nut is unitized.

(A15) In any of the torque-limiting axle nuts denoted (A1) to (A14), the retaining ring is engaged with a retaining-ring notch that extends radially inward from a cylindrical outer face of the inner-nut body.

(A16) In any of the torque-limiting axle nuts denoted (A1) to (A15), the inner-nut body extends axially upward to form an extended portion that is shaped as a polygon.

(A17) In the torque-limiting axle nut denoted (A16), the polygon is a regular octagon or a regular hexagon.

(A18) In either of the torque-limiting axle nuts denoted (A16) and (A17), the extended portion forms an unthreaded center hole.

(A19) In any of the torque-limiting axle nuts denoted (A1) to (A18), the inner nut forms a plurality of plunger mounting holes extending axially upward from a bottom face of the inner nut. The torque-limiting axle nut further includes a plurality of spring plungers affixed in the plurality of plunger mounting holes and a locator plate forming a center unthreaded hole that is centered on the rotation axis. The locator plate forms a plurality of detent holes located azimuthally around the rotation axis. The locator plate faces the bottom faces of the inner nut such that the plurality of spring plungers can engage with the plurality of detent holes as the inner nut rotates around the rotation axis.

(A20) In the torque-limiting axle nut denoted (A19), the plurality of spring plungers are centered identically at a radial distance from the rotation axis.

(A21) In the torque-limiting axle nuts denoted (A20), the plurality of detent holes are centered identically at the radial distance.

(A22) In any of the torque-limiting axle nuts denoted (A19) to (A21), the plurality of spring plungers are uniformly spaced around the rotation axis.

(A23) In any of the torque-limiting axle nuts denoted (A19) to (A22), the locator plate forms a key shaped to engage with a slot of a threaded axle to rotationally constrain the locator plate relative to the threaded axle.

(A24) In any of the torque-limiting axle nuts denoted (A19) to (A23), each of the plurality of detent holes is shaped as a countersunk hole or a countersunk stadium.

(A25) In any of the torque-limiting axle nuts denoted (A1) to (A13), the plurality of ball bearings identically have a ball-bearing diameter, the flange has an axial thickness less than the ball-bearing diameter, and each of the plurality of recesses is a through hole.

(A26) In the torque-limiting axle nut denoted (A25), the torque-limiting axle nut of further includes a locator plate forming a center unthreaded hole that is centered on the rotation axis. The locator plate forms a plurality of detent holes located azimuthally around the rotation axis. The locator plate faces a bottom face of the inner nut such that the plurality of ball bearings can engage with the plurality of detent holes as the inner nut rotates around the rotation axis.

(A27) In the torque-limiting axle nut denoted (A26), the plurality of detent holes are centered identically at a radial distance from the rotation axis, the plurality of recesses are centered identically at the radial distance, and the plurality of grooves are centered identically at the radial distance.

(A28) In either of the torque-limiting axle nuts denoted (A26) and (A27), the locator plate forms a key shaped to engage with a slot of a threaded axle to rotationally constrain the locator plate relative to the threaded axle.

(A29) In any of the torque-limiting axle nuts denoted (A26) to (A28), each of the plurality of detent holes is shaped as a countersunk hole or a countersunk stadium.

(A30) In any of the torque-limiting axle nuts denoted (A26) to (A29), the torque-limiting axle nut is unitized.

(B1) A torque-limiting axle nut includes an inner nut having an inner-nut body forming a threaded center hole that defines a rotation axis of the torque-limiting axle nut. The inner nut also has a flange located azimuthally around the inner-nut body and radially away from the inner-nut body. The inner nut also has a plurality of upward nubs extending axially upward from the flange. The torque-limiting axle nut also includes a retaining ring located azimuthally around the inner-nut body and an outer nut located azimuthally around the inner-nut body. The outer nut has a plurality of downward nubs that extend axially downward from a bottom face of the outer nut. The plurality of downward nubs are radially located to engage with the plurality of upward nubs as the outer nut rotates with respect to the inner nut. The torque-limiting axle nut also includes a wave spring located azimuthally around the inner-nut body. The wave spring is located axially between the retaining ring and a top face of the outer nut.

(B2) In the torque-limiting axle nut denoted (B1), each of the plurality of downward nubs has a front face that forms an obtuse angle with respect to the bottom face of the outer nut.

(B3) In either of the torque-limiting axle nuts denoted (B1) and (B2), each of the plurality of downward nubs has a rear face that forms a right angle or an obtuse angle with respect to the bottom face of the outer nut.

(B4) In any of the torque-limiting axle nuts denoted (B1) to (B3), each of the plurality of upward nubs has a front face that forms an obtuse angle with respect to a top face of the flange.

(B5) In any of the torque-limiting axle nuts denoted (B1) to (B4), each of the plurality of upward nubs has a rear face that forms a right angle or an obtuse angle with respect to the top face of the flange.

(B6) In any of the torque-limiting axle nuts denoted (B1) to (B5), the plurality of upward nubs are located identically at a radial distance from the rotation axis.

(B7) In the torque-limiting axle nut denoted (B6), the plurality of downward nubs are located identically at the radial distance.

(B8) In any of the torque-limiting axle nuts denoted (B1) to (B7), the plurality of upward nubs are spaced uniformly around the rotation axis.

(B9) In any of the torque-limiting axle nuts denoted (B1) to (B8), the plurality of downward nubs are spaced uniformly around the rotation axis.

(B10) In any of the torque-limiting axle nuts denoted (B1) to (B9), the inner-nut body has a top face and a bottom face. The bottom face of the inner-nut body lies parallel to the top face of the inner-nut body and axially beneath the top face of the inner-nut body. The outer nut is fully located between the top and bottom faces of the inner-nut body.

(B11) In any of the torque-limiting axle nuts denoted (B1) to (B10), a bottom face of the flange lies flush with a bottom face of the inner-nut body.

(B12) In any of the torque-limiting axle nuts denoted (B1) to (B11), the outer nut is shaped as a polygon.

(B13) In the torque-limiting axle nut denoted (B12), the polygon is a regular hexagon or a regular octagon.

(B14) In any of the torque-limiting axle nuts denoted (B1) to (B13), the torque-limiting axle nut is unitized.

(B15) In any of the torque-limiting axle nuts denoted (B1) to (B14), the retaining ring is engaged with a retaining-ring notch that extends radially inward from a cylindrical outer face of the inner-nut body.

(B16) In any of the torque-limiting axle nuts denoted (B1) to (B15), the inner-nut body extends axially upward to form an extended portion that is shaped as a polygon.

(B17) In the torque-limiting axle nut denoted (B16), the polygon is a regular octagon or a regular hexagon.

(B18) In either of the torque-limiting axle nuts denoted (B16) and (B17), the extended portion forms an unthreaded center hole.

(B19) In any of the torque-limiting axle nuts denoted (B1) to (B18), the inner nut has a plurality of locator nubs that extend axially downward from a bottom face of the inner nut. The torque-limiting axle nut further includes a locator plate forming a center unthreaded hole that is centered on the rotation axis. The locator plate forms a plurality of detent holes located azimuthally around the rotation axis. The locator plate faces the bottom face of the inner nut such that the plurality of bottom nubs can engage with the plurality of detent holes as the inner nut rotates around the rotation axis.

(B20) In the torque-limiting axle nut denoted (B19), the plurality of bottom nubs are centered identically at a radial distance from the rotation axis.

(B21) In the torque-limiting axle nut denoted (B20), the plurality of detent holes are centered identically at the radial distance.

(B22) In any of the torque-limiting axle nuts denoted (B19) to (B21), the plurality of bottom nubs of the inner nut are uniformly spaced around the rotation axis.

(B23) In any of the torque-limiting axle nuts denoted (B19) to (B22), the locator plate forms a key shaped to engage with a slot of a threaded axle to rotationally constrain the locator plate relative to the threaded axle.

(B24) In any of the torque-limiting axle nuts denoted (B19) to (B23), each of the plurality of detent holes is shaped as a countersunk hole or a countersunk stadium.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A torque-limiting axle nut, comprising:
   an inner nut having:
      an inner-nut body forming a threaded center hole that defines a rotation axis of the torque-limiting axle nut; and
      a flange located azimuthally around the inner-nut body and extending radially away from the inner-nut body, the flange forming a plurality of recesses;
   a retaining ring located azimuthally around the inner-nut body;
   an outer nut located azimuthally around the inner-nut body, the outer nut forming a plurality of grooves that (i) extend axially upward from a bottom face of the outer nut and (ii) extend azimuthally around the rotation axis, wherein for each pair of neighboring grooves of the plurality of grooves, the outer nut forms a ridge that separates the neighboring grooves of said each pair;
   a wave spring located azimuthally around the inner-nut body, the wave spring being located axially between the retaining ring and a top face of the outer nut; and
   a plurality of ball bearings seated in the plurality of recesses and extending into the plurality of grooves.

2. The torque-limiting axle nut of claim 1, the ridge having a front face that forms an obtuse angle with respect to a recessed surface of a first groove of said each pair of neighboring grooves.

3. The torque-limiting axle nut of claim 1, the ridge having a rear face that forms a right angle or an obtuse angle with respect to a recessed surface of a second groove of said each pair of neighboring grooves.

4. The torque-limiting axle nut of claim 1, the ridge having a bottom face that lies flush with the bottom face of the outer nut.

5. The torque-limiting axle nut of claim 1, wherein:
   the plurality of ball bearings identically have a ball-bearing diameter; and
   the plurality of grooves identically have a radial width that is larger than the ball-bearing diameter.

6. The torque-limiting axle nut of claim 1, the outer nut being shaped as a polygon.

7. The torque-limiting axle nut of claim 1, the plurality of recesses being centered identically at a radial distance from the rotation axis.

8. The torque-limiting axle nut of claim 7, the plurality of grooves being centered identically at the radial distance.

9. The torque-limiting axle nut of claim 1, the plurality of grooves extending identically around the rotation axis by an azimuthal range.

10. The torque-limiting axle nut of claim 1, the plurality of recesses being uniformly spaced around the rotation axis.

11. The torque-limiting axle nut of claim 1, being unitized.

12. The torque-limiting axle nut of claim 1, the retaining ring being engaged with a retaining-ring notch that extends radially inward from a cylindrical outer face of the inner-nut body.

13. The torque-limiting axle nut of claim 1, the inner-nut body extending axially upward to form an extended portion that is shaped as a polygon, the extended portion forming an unthreaded center hole.

14. The torque-limiting axle nut of claim 1, wherein:
   the inner nut forms a plurality of plunger mounting holes extending axially upward from a bottom face of the inner nut;
   the torque-limiting axle nut further comprises:
      a plurality of spring plungers affixed in the plurality of plunger mounting holes; and
      a locator plate forming a center unthreaded hole that is centered on the rotation axis, the locator plate forming a plurality of detent holes located azimuthally around the rotation axis; and
   the locator plate faces the bottom face of the inner nut such that the plurality of spring plungers can engage with the plurality of detent holes as the inner nut rotates around the rotation axis.

15. The torque-limiting axle nut of claim 14, the plurality of spring plungers being centered identically at a radial distance from the rotation axis.

16. The torque-limiting axle nut of claim 15, the plurality of detent holes being centered identically at the radial distance.

17. The torque-limiting axle nut of claim 14, the plurality of spring plungers being uniformly spaced around the rotation axis.

18. The torque-limiting axle nut of claim 14, the locator plate forming a key shaped to engage with a slot of a threaded axle to rotationally constrain the locator plate relative to the threaded axle.

19. The torque-limiting axle nut of claim 14, each of the plurality of detent holes being shaped as a countersunk hole or a countersunk stadium.

20. The torque-limiting axle nut of claim 14, being unitized.

21. The torque-limiting axle nut of claim 1, wherein:
the plurality of ball bearings identically have a ball-bearing diameter;
the flange has an axial thickness less than the ball-bearing diameter; and
each of the plurality of recesses is a through hole.

22. The torque-limiting axle nut of claim 21, further comprising a locator plate forming a center unthreaded hole that is centered on the rotation axis, the locator plate forming a plurality of detent holes located azimuthally around the rotation axis, the locator plate facing a bottom face of the inner nut such that the plurality of ball bearings can engage with the plurality of detent holes as the inner nut rotates around the rotation axis.

23. The torque-limiting axle nut of claim 22, wherein:
the plurality of detent holes are centered identically at a radial distance from the rotation axis;
the plurality of recesses are centered identically at the radial distance; and
the plurality of grooves are centered identically at the radial distance.

24. The torque-limiting axle nut of claim 22, the locator plate forming a key shaped to engage with a slot of a threaded axle to rotationally constrain the locator plate relative to the threaded axle.

25. The torque-limiting axle nut of claim 22, each of the plurality of detent holes being shaped as a countersunk hole or a countersunk stadium.

26. The torque-limiting axle nut of claim 22, being unitized.

* * * * *